(12) United States Patent
Liu et al.

(10) Patent No.: US 11,533,734 B1
(45) Date of Patent: Dec. 20, 2022

(54) SIDELINK COMMUNICATION ORDERING

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US); Shuanshuan Wu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 26 days.

(21) Appl. No.: 17/303,344

(22) Filed: May 27, 2021

(51) Int. Cl.
*H04W 72/12* (2009.01)
*H04W 92/18* (2009.01)
*H04L 1/18* (2006.01)

(52) U.S. Cl.
CPC ... *H04W 72/1205* (2013.01); *H04W 72/1263* (2013.01); *H04W 72/1289* (2013.01); *H04L 1/1812* (2013.01); *H04W 92/18* (2013.01)

(58) Field of Classification Search
CPC ......... H04W 72/1205; H04W 72/1263; H04W 72/1289; H04W 92/18; H04L 1/1812
See application file for complete search history.

(56) References Cited

U.S. PATENT DOCUMENTS

| | | | |
|---|---|---|---|
| 10,925,039 B2 * | 2/2021 | Kung | H04L 1/1887 |
| 2020/0205165 A1 * | 6/2020 | Huang | H04L 5/0051 |
| 2020/0274649 A1 * | 8/2020 | Lee | H04W 72/087 |
| 2021/0105126 A1 * | 4/2021 | Yi | H04W 72/1242 |
| 2021/0321396 A1 * | 10/2021 | Li | H04L 1/1896 |
| 2021/0400687 A1 * | 12/2021 | Yeo | H04L 5/0053 |
| 2022/0086803 A1 * | 3/2022 | Li | H04W 72/02 |
| 2022/0103292 A1 * | 3/2022 | Hwang | H04W 76/28 |
| 2022/0109527 A1 * | 4/2022 | Hwang | H04L 5/0055 |
| 2022/0183002 A1 * | 6/2022 | Yeo | H04L 5/0094 |
| 2022/0216946 A1 * | 7/2022 | Liu | H04L 1/08 |
| 2022/0225408 A1 * | 7/2022 | Lee | H04W 72/1278 |
| 2022/0232549 A1 * | 7/2022 | Yeo | H04L 1/0028 |
| 2022/0232627 A1 * | 7/2022 | Lee | H04L 5/0055 |
| 2022/0240289 A1 * | 7/2022 | Karaki | H04L 5/0055 |

FOREIGN PATENT DOCUMENTS

WO WO-2021194269 A1 * 9/2021

\* cited by examiner

*Primary Examiner* — Nathan S Taylor
(74) *Attorney, Agent, or Firm* — Harrity & Harrity, LLP

(57) ABSTRACT

Various aspects of the present disclosure generally relate to wireless communication. In some aspects, a user equipment (UE) may receive, on an access link from a base station, a first downlink control information (DCI) that schedules a first communication on a physical sidelink shared channel (PSSCH) and a second DCI that schedules a second communication on the PSSCH. The first communication and the second communication may be scheduled according to a rule for overlapping or ordering communications on the PSSCH that are associated with one or more hybrid automatic repeat request identifiers. The UE may transmit the first communication and the second communication as scheduled. Numerous other aspects are described.

30 Claims, 16 Drawing Sheets

1100 ⟶

1110 — Receive, on an access link from a base station, a first downlink control information (DCI) that schedules a first communication on a physical sidelink shared channel (PSSCH) and a second DCI that schedules a second communication on the PSSCH, where the first communication and the second communication are scheduled according to a rule for overlapping or ordering communications on the PSSCH that are associated with one or more hybrid automatic repeat request (HARQ) IDs 1120 — Transmit the first communication and the second communication as scheduled

SIDELINK COMMUNICATION ORDERING

FIELD OF THE DISCLOSURE

Aspects of the present disclosure generally relate to wireless communication and to techniques and apparatuses for ordering sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, on an access link from a base station, a first downlink control information (DCI) that schedules a first communication on a physical sidelink shared channel (PSSCH) and a second DCI that schedules a second communication on the PSSCH. The first communication and the second communication may be scheduled according to a rule for overlapping or ordering communications on the PSSCH that are associated with one or more hybrid automatic repeat request (HARQ) identifiers (IDs). The method may include transmitting the first communication and the second communication as scheduled.

In some aspects, a method of wireless communication performed by a base station includes transmitting, to a UE on an access link, a first DCI that schedules a first communication to be transmitted by the UE on a PSSCH and a second DCI that schedules a second communication to be transmitted by the UE on the PSSCH. The first DCI and the second DCI may be transmitted, and the first communication and the second communication may be scheduled, according to a rule for overlapping or ordering communications on the PSSCH that are associated with one or more HARQ IDs. The method may include transmitting the first DCI and the second DCI according to the rule.

In some aspects, a method of wireless communication performed by a UE includes receiving, from a transmitting UE, a first communication on a PSSCH and transmitting feedback for the first communication on a physical sidelink feedback channel (PSFCH). The method may include receiving, from the transmitting UE, a second communication that is scheduled according to a rule for overlapping or ordering communications on the PSSCH that are associated with one or more HARQ IDs. The method may include transmitting the feedback for the second communication on the PSFCH.

In some aspects, a UE for wireless communication includes a memory and one or more processors, coupled to the memory, configured to receive, on an access link from a base station, a first DCI that schedules a first communication on a PSSCH and a second DCI that schedules a second communication on the PSSCH. The first communication and the second communication may be scheduled according to a rule for overlapping or ordering communications on the PSSCH that are associated with one or more HARQ IDs. The one or more processors may be configured to transmit the first communication and the second communication as scheduled.

In some aspects, a base station for wireless communication includes a memory and one or more processors, coupled to the memory, configured to transmit, to a UE on an access link, a first DCI that schedules a first communication to be transmitted by the UE on a PSSCH and a second DCI that schedules a second communication to be transmitted by the UE on the PSSCH. The first DCI and the second DCI may be transmitted, and the first communication and the second communication may be scheduled, according to a rule for overlapping or ordering communications on the PSSCH that are associated with one or more HARQ IDs. The one or more processors may be configured to transmit the first DCI and the second DCI according to the rule.

In some aspects, a UE for wireless communication includes a memory and one or more processors, coupled to the memory, configured to receive, from a transmitting UE, a first communication on a PSSCH, transmit feedback for the first communication on a PSFCH, and receive, from the transmitting UE, a second communication that is scheduled according to a rule for overlapping or ordering communications on the PSSCH that are associated with one or more HARQ IDs. The one or more processors may be configured to transmit the feedback for the second communication on the PSFCH.

In some aspects, a non-transitory computer-readable medium storing a set of instructions for wireless communication includes one or more instructions that, when executed by one or more processors of a UE, cause the UE to receive, on an access link from a base station, a first DCI that schedules a first communication on a PSSCH and a second DCI that schedules a second communication on the PSSCH, where the first communication and the second communication are scheduled according to a rule for overlapping or ordering communications on the PSSCH that are associated with one or more HARQ IDs, and transmit the first communication and the second communication as scheduled.

In some aspects, a non-transitory computer-readable medium storing a set of instructions for wireless communication includes one or more instructions that, when executed by one or more processors of a base station, cause the base station to transmit, to a UE on an access link, a first DCI that schedules a first communication to be transmitted by the UE on a PSSCH and a second DCI that schedules a second communication to be transmitted by the UE on the PSSCH, where the first DCI and the second DCI are transmitted, and the first communication and the second communication are scheduled, according to a rule for overlapping or ordering communications on the PSSCH that are associated with one or more HARQ IDs, and transmit the first DCI and the second DCI according to the rule.

In some aspects, a non-transitory computer-readable medium storing a set of instructions for wireless communication includes one or more instructions that, when executed by one or more processors of a UE, cause the UE to receive, from a transmitting UE, a first communication on a PSSCH, transmit feedback for the first communication on a PSFCH, and receive, from the transmitting UE, a second communication that is scheduled according to a rule for overlapping or ordering communications on the PSSCH that are associated with one or more HARQ IDs, and transmit the feedback for the second communication on the PSFCH.

In some aspects, an apparatus for wireless communication includes means for receiving, on an access link from a base station, a first DCI that schedules a first communication on a PSSCH and a second DCI that schedules a second communication on the PSSCH, where the first communication and the second communication are scheduled according to a rule for overlapping or ordering communications on the PSSCH that are associated with one or more hybrid automatic repeat request identifiers, and means for transmitting the first communication and the second communication as scheduled.

In some aspects, an apparatus for wireless communication includes means for transmitting, to a UE on an access link, a first DCI that schedules a first communication to be transmitted by the UE on a PSSCH and a second DCI that schedules a second communication to be transmitted by the UE on the PSSCH, where the first DCI and the second DCI are transmitted, and the first communication and the second communication are scheduled, according to a rule for overlapping or ordering communications on the PSSCH that are associated with one or more hybrid automatic repeat request identifiers, and means for transmitting the first DCI and the second DCI according to the rule.

In some aspects, an apparatus for wireless communication includes means for receiving, from a transmitting UE, a first communication on a PSSCH, means for transmitting feedback for the first communication on a PSFCH, means for receiving, from the transmitting UE, a second communication that is scheduled according to a rule for overlapping or ordering communications on the PSSCH that are associated with one or more hybrid automatic repeat request identifiers, and means for transmitting the feedback for the second communication on the PSFCH.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
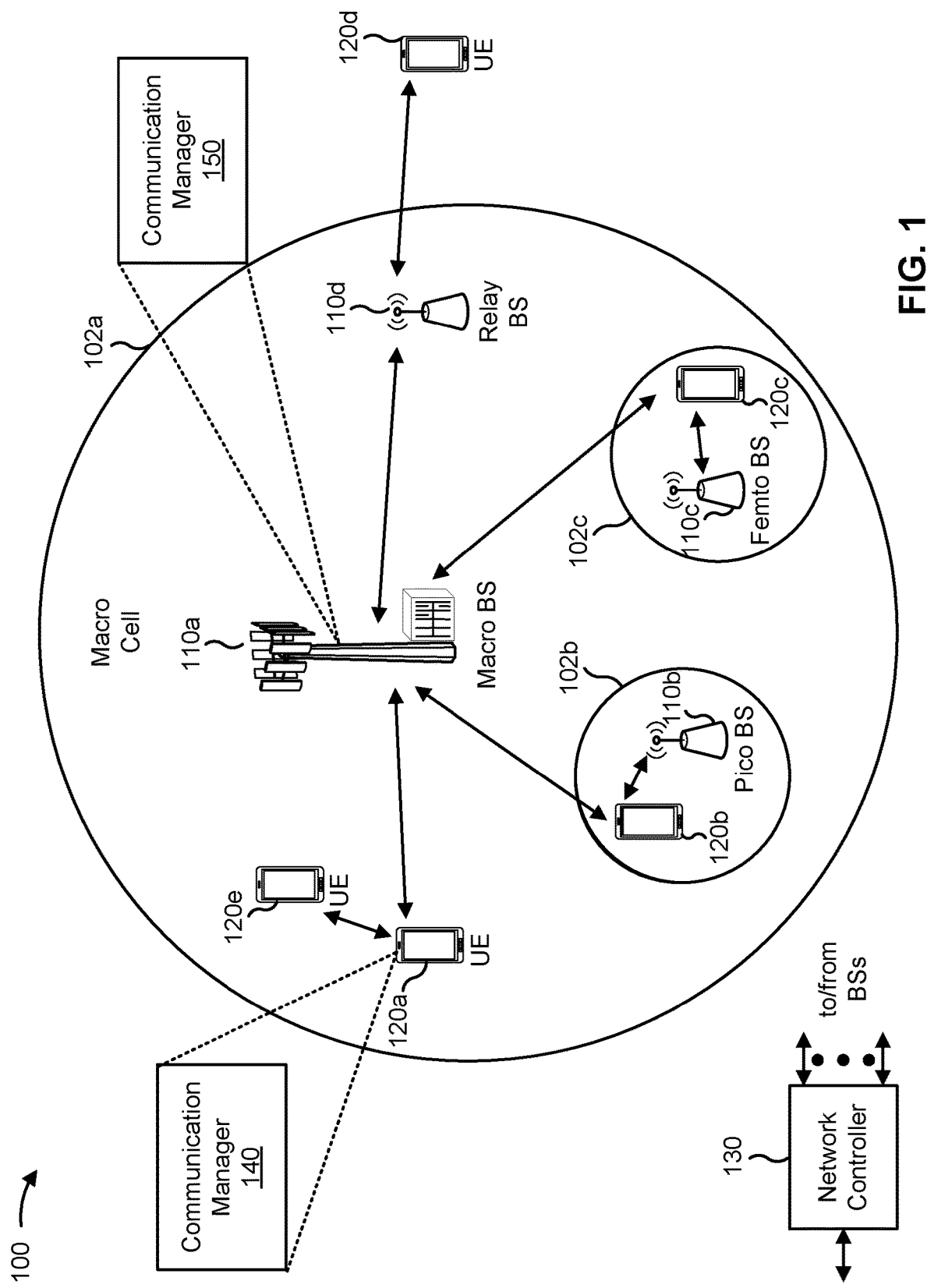
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples.

The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, on an access link from a base station, a first downlink control information (DCI) that schedules a first communication on a physical sidelink shared channel (PSSCH) and a second DCI that schedules a second communication on the PSSCH. The first communication and the second communication may be scheduled according to a rule for overlapping or ordering communications on the PSSCH that are associated with one or more hybrid automatic repeat request (HARQ) identifiers (IDs). The communication manager 140 may transmit the first communication and the second communication as scheduled. Additionally, or alternatively, the communication manager 140 may perform one or more other operations described herein.

In some aspects, the base station 110 may include a communication manager 150. As described in more detail elsewhere herein, the communication manager 150 may transmit, to a UE on an access link, a first DCI that schedules a first communication to be transmitted by the UE on a PSSCH and a second DCI that schedules a second communication to be transmitted by the UE on the PSSCH. The first DCI and the second DCI may be transmitted, and the first communication and the second communication may be scheduled, according to a rule for overlapping or ordering communications on the PSSCH that are associated with one or more HARQ IDs. The communication manager 150 may transmit the first DCI and the second DCI according to the rule. Additionally, or alternatively, the communication manager 150 may perform one or more other operations described herein.

In some aspects, the UE 120 may include a communication manager 140. As described in more detail elsewhere herein, the communication manager 140 may receive, from a transmitting UE, a first communication on a PSSCH, transmit feedback for the first communication on a physical sidelink feedback channel (PSFCH), and receive, from the transmitting UE, a second communication that is scheduled according to a rule for overlapping or ordering communications on the PSSCH that are associated with one or more HARQ IDs. The communication manager 140 may transmit the feedback for the second communication on the PSFCH. Additionally, or alternatively, the communication manager 140 may perform one or more other operations described herein.

As indicated above, FIG. 1 is provided as an example. Other examples may differ from what is described with regard to FIG. 1.

Figure 2:
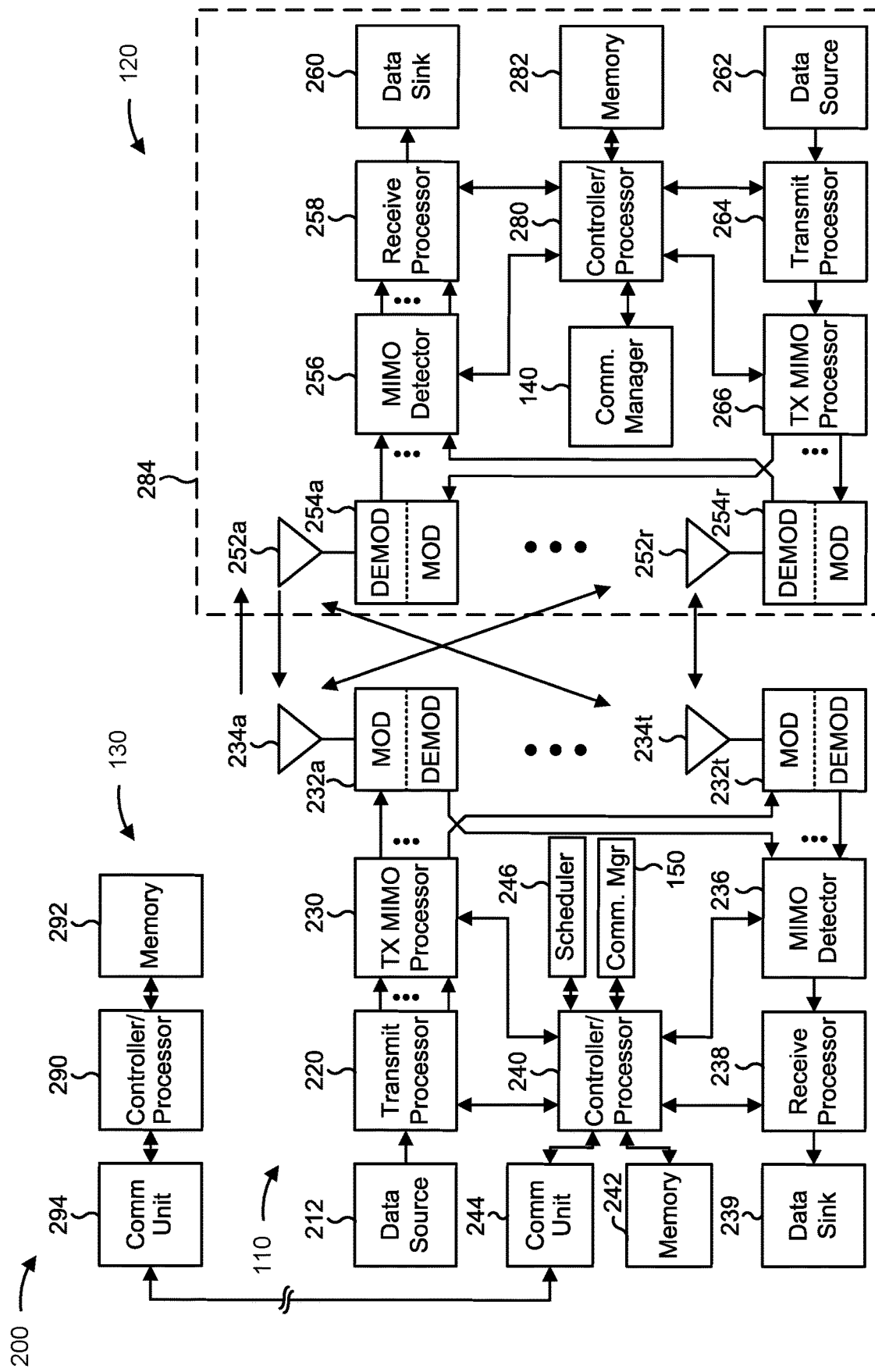
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-16).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-16).

Controller/processor 240 of base station 110, controller/processor 280 of UE 120, and/or any other component(s) of FIG. 2 may perform one or more techniques associated with ordering sidelink communications, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, the UE 120 includes means for receiving, on an access link from a base station, a first DCI that schedules a first communication on a PSSCH and a second DCI that schedules a second communication on the PSSCH, where the first communication and the second communication are scheduled according to a rule for overlapping or ordering communications on the PSSCH that are associated with one or more HARQ IDs, and/or means for transmitting the first communication and the second communication as scheduled. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to a UE on an access link, a first DCI that schedules a first communication to be transmitted by the UE on a PSSCH and a second DCI that schedules a second communication to be transmitted by the UE on the PSSCH, where the first DCI and the second DCI are transmitted, and the first communication and the second communication are scheduled, according to a rule for overlapping or ordering communications on the PSSCH that are associated with one or more HARQ IDs, and/or means for transmitting the first DCI and the second DCI according to the rule. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, the UE 120 includes means for receiving, from a transmitting UE, a first communication on a PSSCH, means for transmitting feedback for the first communication on a PSFCH, means for receiving, from the transmitting UE, a second communication that is scheduled according to a rule for overlapping or ordering communications on the PSSCH that are associated with one or more HARQ IDs, and/or means for transmitting the feedback for the second communication on the PSFCH. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
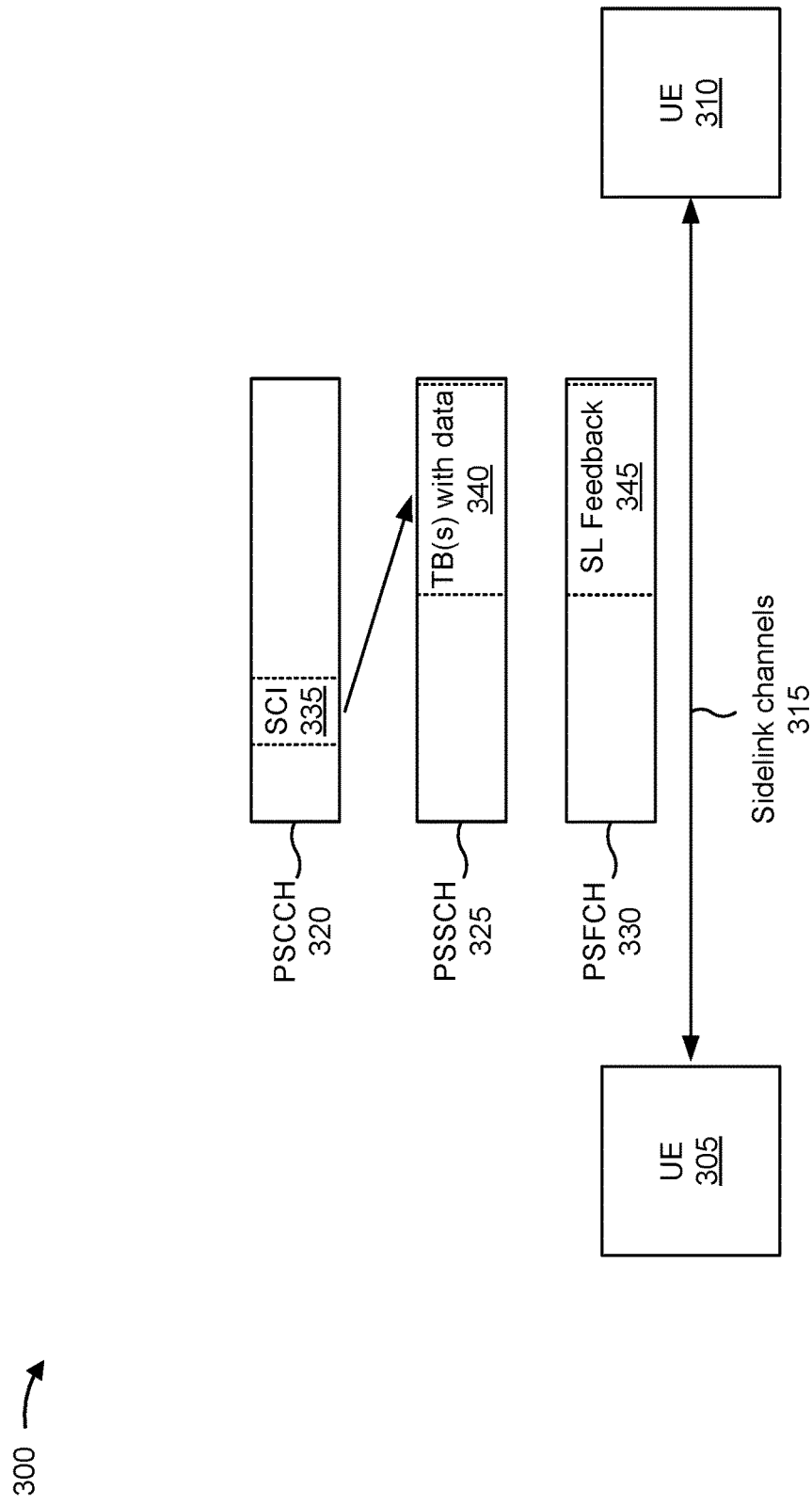
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a transmitting device, such as a first UE 305, may communicate with a receiving device, such as a second UE 310 (and one or more other UEs), via one or more sidelink channels 315. UE 305 and UE 310 may communicate using the one or more sidelink channels 315 for P2P communications, D2D communications, V2X communications (e.g., which may include V2V communications, V2I communications, and/or vehicle-to-pedestrian (V2P) communications) and/or mesh networking. In some aspects, UE 305 and UE 310 may correspond to one or more other UEs described elsewhere herein, such as UE 120. In some aspects, the one or more sidelink channels 315 may use a PC5 interface and/or may operate in a high frequency band (e.g., the 5.9 GHz band). Additionally, or alternatively, UE 305 and UE 310 may synchronize timing of transmission time intervals (TTIs) (e.g., frames, subframes, slots, or symbols) using global navigation satellite system (GNSS) timing.

As further shown in FIG. 3, the one or more sidelink channels 315 may include a physical sidelink control channel (PSCCH) 320, a PSSCH 325, and/or a physical PSFCH 330. The PSCCH 320 may be used to communicate control information, similar to a physical downlink control channel (PDCCH) and/or a physical uplink control channel (PUCCH) used for cellular communications with a base station 110 via an access link or an access channel. The PSSCH 325 may be used to communicate data, similar to a physical downlink shared channel (PDSCH) and/or a physical uplink shared channel (PUSCH) used for cellular communications with a base station 110 via an access link or an access channel. For example, the PSCCH 320 may carry sidelink control information (SCI) 335, which may indicate various control information used for sidelink communications, such as one or more resources (e.g., time resources, frequency resources, and/or spatial resources) where a transport block (TB) 340 may be carried on the PSSCH 325. The TB 340 may include data. The PSFCH 330 may be used to communicate sidelink feedback 345, such as HARQ feedback (e.g., acknowledgement or negative acknowledgement (ACK/NACK) information), transmit power control (TPC), and/or a scheduling request (SR).

In some aspects, the one or more sidelink channels 315 may use resource pools. For example, a scheduling assignment (e.g., included in SCI 335) may be transmitted in sub-channels using specific resource blocks (RBs) across time. In some aspects, data transmissions (e.g., on the PSSCH 325) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, UE 305 may operate using a transmission mode where resource selection and/or scheduling is performed by UE 305 (e.g., rather than a base station 110). In some aspects, UE 305 may perform resource selection and/or scheduling by sensing channel availability for transmissions. For example, UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, UE 305 may perform resource selection and/or scheduling using SCI 335 received in the PSCCH 320, which may indicate occupied resources and/or channel parameters. Additionally, or alternatively, UE 305 may perform resource selection and/or scheduling by determining a channel busy rate (CBR) associated with various sidelink channels, which may be used for rate control (e.g., by indicating a maximum number of resource blocks that UE 305 can use for a particular set of subframes).

In the transmission mode where resource selection and/or scheduling is performed by UE 305, UE 305 may generate sidelink grants, and may transmit the grants in SCI 335. A sidelink grant may indicate, for example, one or more parameters (e.g., transmission parameters) to be used for an upcoming sidelink transmission, such as one or more resource blocks to be used for the upcoming sidelink transmission on the PSSCH 325 (e.g., for TBs 340), one or more subframes to be used for the upcoming sidelink transmission, and/or a modulation and coding scheme (MCS) to be used for the upcoming sidelink transmission. In some aspects, UE 305 may generate a sidelink grant that indicates one or more parameters for semi-persistent scheduling (SPS), such as a periodicity of a sidelink transmission. Additionally, or alternatively, UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
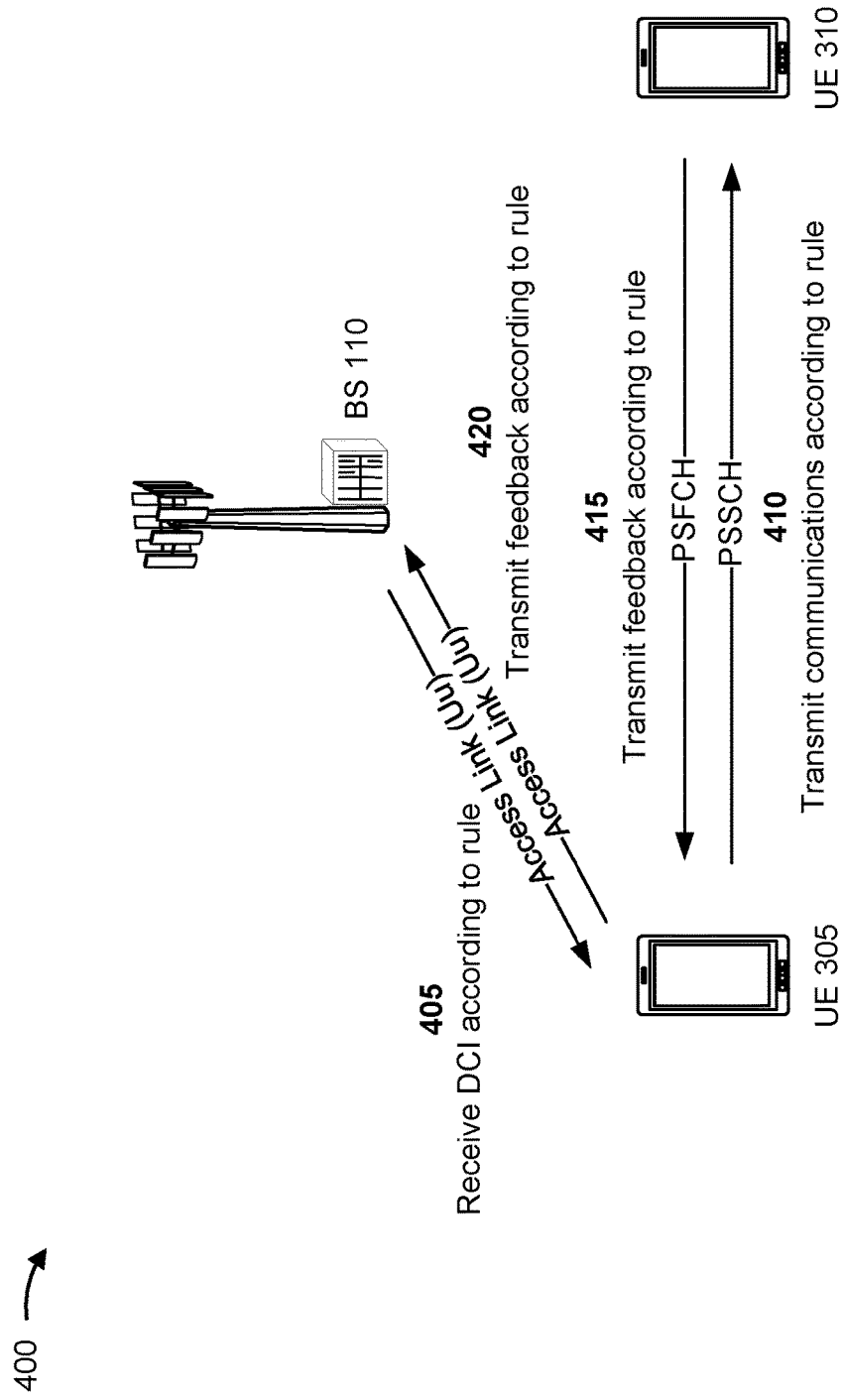
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, UE 305 and UE 310 may communicate with one another via a sidelink, as described above in connection with FIG. 3. As further shown, in some sidelink modes, the BS 110 may communicate with UE 305 via a first access link. If UE 305 schedules communication resources for UE 310 with the assistance of the base station 110, this may be referred to as sidelink "Mode 1". If UE 305 schedules communication resources for UE 310, rather than the base station 110, this may be referred to as sidelink "Mode 2". UE 305 and UE 310 may correspond to one or more UEs described elsewhere herein, such as the UE 120 of FIG. 1. Thus, a direct link between UEs 120 (e.g., via a PC5 interface) may be referred to as a sidelink, and a direct link between the base station and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110). In some aspects, UE 305 may receive a first DCI scheduling a first communication on the PSSCH and a second DCI scheduling a second communication on the PSSCH. UE 305 may transmit the first communication and the second communication according to the scheduling indicated by the first DCI and the second DCI, respectively.

For communications on the access link, BS 110 may use a downlink "out of order" (OoO) rule to avoid UE 305 receiving communications on the PDSCH out of order. For example, if a second communication on the PDSCH was received by UE 305 on the PDSCH before a first communication was received, the second communication and the first communication may be out of order if the first communication is intended to be received by UE 305 before the second communication. To avoid this OoO scenario, the downlink OoO rule may specify that for a given HARQ process, UE 305 is not expected to receive the second communication until a HARQ-ACK for the first communication is transmitted. BS 110 and UE 305 may also operate according to an uplink OoO rule. For example, the rule may specify that UE 305 is not expected to transmit a first communication on the PUSCH concurrently with a second communication and that UE 305 may not be scheduled to transmit the second communication on the PUSCH before an end of the first communication.

As for sidelink communications, PSSCH and PSFCH are designed to be in order. However, currently, there is no rule for ordering or overlapping communications with respect to DCI, HARQ IDs, and communications on the PSSCH, PSFCH, and the PUCCH. There is currently no rule for ordering sidelink communications and HARQ feedback when a receiving UE of a sidelink channel is to transmit HARQ feedback. There is also currently no rule for ordering sidelink communications with respect to listen-before-talk (LBT) failure reporting. Without clarifying rules for the sidelink channel, sidelink communications and HARQ feedback for the sidelink communications may be received out of order, or in a manner that consumes additional processing resources and signaling resources of the sidelink UEs.

According to various aspects described herein, UE 305 may be configured to receive DCI and transmit communications according to one or more rules for ordering or overlapping communications on the PSSCH. The communications on the PSSCH may be associated with HARQ processes that are identified by HARQ IDs. For example, in a first scenario where HARQ feedback is disabled and the HARQ ID is the same for a first communication and a second communication, a rule may specify that the second DCI that schedules the second communication may be received after the first communication is transmitted and before the second communication is transmitted. Another rule may specify, for this first scenario, that the first communication is transmitted after the second DCI is received.

In a second scenario where HARQ feedback is enabled and the HARQ ID is the same for the first communication and the second communication, a rule may specify that the second DCI may be received after feedback for the first communication is transmitted. Another rule may specify, for this second scenario, that the second DCI is received after the first communication is transmitted and before feedback for the first communication is transmitted, and that the second communication is transmitted after the feedback for the first communication is transmitted.

Another rule may specify that the first communication and the second communication are not to overlap on the PSSCH, but may overlap if the HARQ IDs are different and the receiving UEs are different. Other rules may be specified, including for scenarios when the HARQ ID for the first communication is different than the HARQ ID for the second communication.

Example 400 shows an access link for uplink and downlink between BS 110 and UE 305, and a sidelink (PSSCH and PSFCH) between UE 305 and UE 310. BS 110, UE 305, and UE 310 may operate in sidelink Mode 1, where BS 110 schedules sidelink communications for UE 305 using DCI. As shown by reference number 405, UE 305 may receive DCI (a first DCI and a second DCI). As shown by reference number 410, UE 305 may transmit communications (a first communication and a second communication) to UE 310. If feedback is enabled, UE 310 may transmit feedback to UE 305, as shown by reference number 415. As shown by reference number 420, UE 305 may transmit the feedback to BS 110. In some scenarios, UE 310 may transmit feedback directly to BS 110. The timing of the feedback, the DCI, and the sidelink communications may be based at least in part on a rule for ordering or overlapping sidelink communications. By following one or more rules for ordering or overlapping sidelink communications, UE 305, UE 310, and/or BS 110 may conserve processing resources and signaling resources.

As indicated above, FIG. 4 is provided as an example. Other examples may differ from what is described with respect to FIG. 4.

Figure 5:
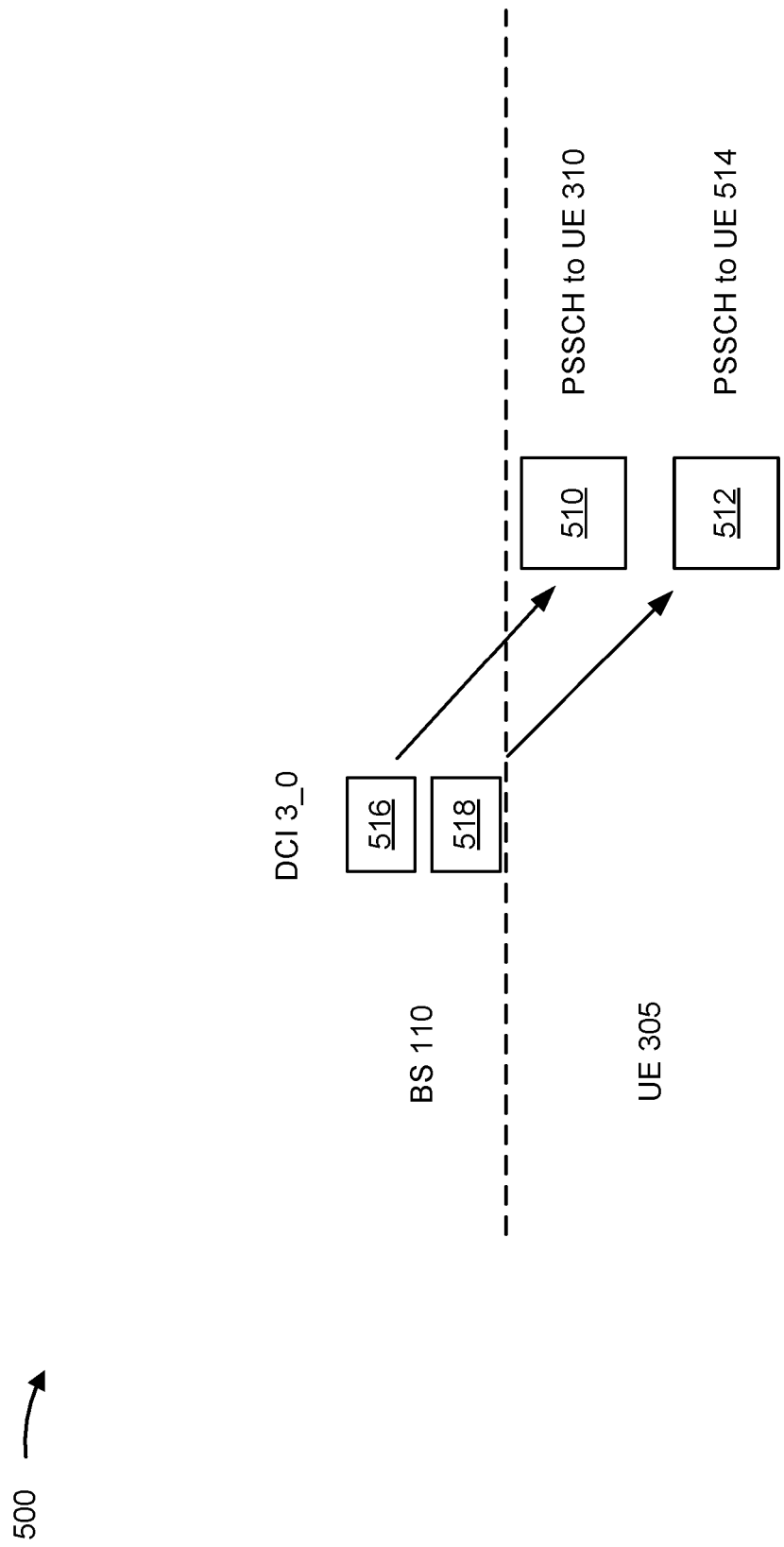
FIG. 5 is a diagram illustrating an example of a rule for overlapping sidelink communications, in accordance with the present disclosure.

FIG. 5 is a diagram illustrating an example 500 of a rule for overlapping sidelink communications, in accordance with the present disclosure. BS 110 may transmit scheduling DCI in DCI format 3_0 to UE 305 on a PDCCH. UE 305 may transmit communications on a PSSCH to UE 310 and to another UE 514. UE 305 may be considered to be a transmitting UE, and may be an anchor node or a controller that serves multiple receivers (e.g., sensors). UE 305 may frequency division multiplex (FDM) communications to the different receivers. UE 310 and UE 514 may be considered to be receiving UEs.

A first communication 510 on the PSSCH may be scheduled by a first DCI 516, and the second communication 512 on the PSSCH may be scheduled by a second DCI 518. In some aspects, the rule may specify that UE 305 is not expected to transmit two overlapping communications on the PSSCH for a same HARQ ID. Accordingly, UE 305 may not transmit the first communication 510 in a same slot or time that overlaps with the second communication 512.

In some aspects, the rule may specify that UE 305 may transmit two overlapping communications on the PSSCH for two respective receiving UEs, such as UE 310 and UE 514, that are associated with different HARQ IDs. Accordingly, UE 305 may transmit the first communication 510 in a same slot or time that overlaps with the second communication 512. The first DCI 516 may overlap with the second DCI 518. That is, a DCI can schedule a communication on the PSSCH in the same slot as a previously scheduled communication on the PSSCH. A quantity of parallel communications on the PSSCH that UE 305 may transmit may be based at least in part on a UE capability of UE 305 or stored configuration information. By specifying a rule for overlapping sidelink communications, UE 305 may act with more clarity and avoid wasting processing resources and signaling resources.

In some aspects, when UE 305 is configured with multiple resource pools, one or more rules for ordering or overlapping may be specified across multiple resource pools. This may be more applicable when HARQ processes are shared across multiple resource pools. Alternatively, the one or more rules may be applied per resource pool.

As indicated above, FIG. 5 is provided as an example. Other examples may differ from what is described with regard to FIG. 5.

Figure 6:
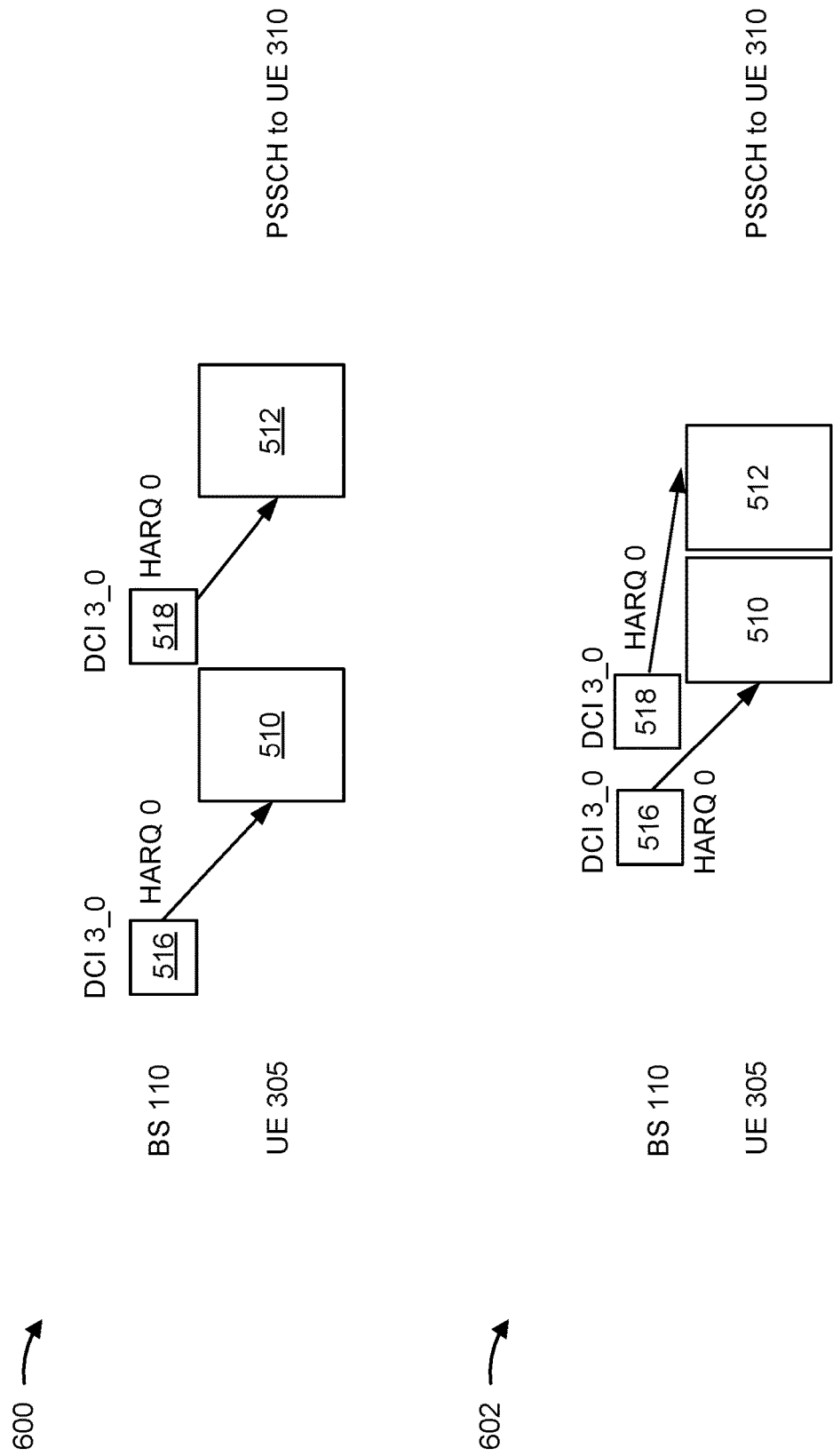
FIG. 6 is a diagram illustrating examples of a rule for ordering sidelink communications, in accordance with the present disclosure.

FIG. 6 is a diagram illustrating examples 600 and 602 of a rule for ordering sidelink communications, in accordance with the present disclosure. Examples 600 and 602 show a BS 110 that transmits DCI to UE 305. UE 305 may transmit communications scheduled by the DCI.

In examples 600 and 602, feedback may be disabled for UE 305, and the HARQ IDs for the DCI may be the same (HARQ 0). In some aspects, a rule, shown by example 600, may specify that UE 305 is not expected to transmit the second communication 512 scheduled by the second DCI 518 until after the first communication 510 for the same HARQ ID. UE 305 may receive the second DCI 518 after the first communication 510 is transmitted. Another rule, shown by example 602, may specify that UE 305 is not expected to transmit the second communication 512 until after an end of the first communication 510 from the same HARQ ID. UE 305 may receive the second DCI 518 before the first communication 510 is transmitted. In some aspects, UE 305 may receive the second DCI 518 before an end of the first communication 510 of the same HARQ ID for blind retransmission.

As indicated above, FIG. 6 provides some examples. Other examples may differ from what is described with regard to FIG. 6.

Figure 7:
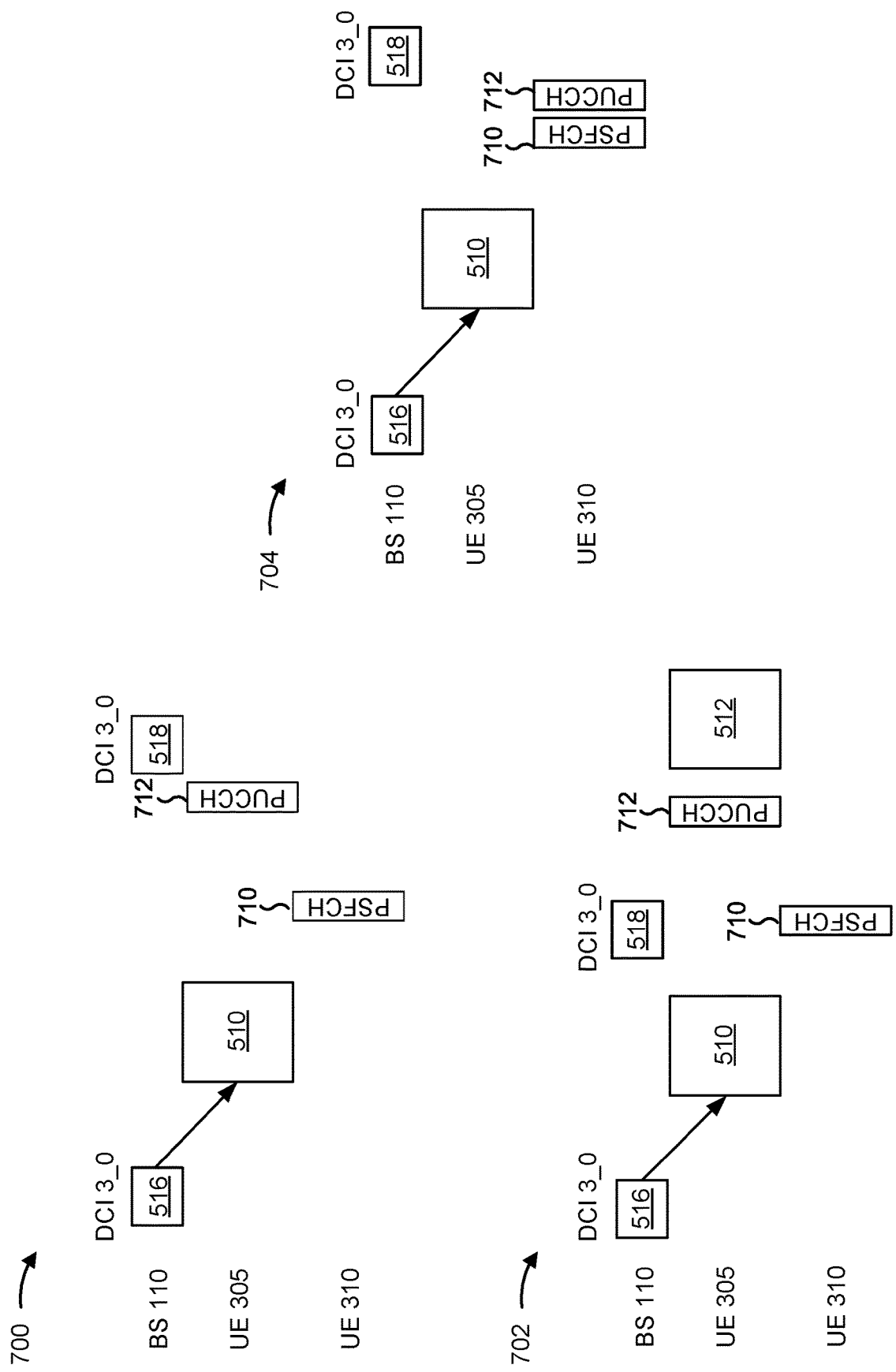
FIG. 7 is a diagram illustrating examples of a rule for ordering sidelink communications, in accordance with the present disclosure.

FIG. 7 is a diagram illustrating examples 700, 702, and 704 of a rule for ordering sidelink communications, in accordance with the present disclosure. Examples 700, 702, and 704 show a BS 110 that transmits DCI to UE 305. UE 305 may transmit communications scheduled by the DCI to UE 310.

In examples 700, 702, and 704, feedback may be enabled for UE 305, and the HARQ IDs for the DCI may be the same (HARQ 0). UE 305 may not be ready to receive a new grant for the same HARQ ID, because UE 305 may not have flushed a buffer after receiving feedback 710 for the first communication 510 from UE 310 on the PSFCH, or after transmitting the feedback 710 to BS 110. The feedback 710 that is transmitted on the PUCCH is shown as feedback 712. In some aspects, a rule, shown by example 700, may specify that UE 305 is not expected to receive the second DCI 518 until UE 305 has transmitted the feedback 712 on the PUCCH. BS 110 may need the feedback 712 before scheduling a new transport block or rescheduling a retransmission. Another rule, shown by example 702, may specify that UE 305 receives the second DCI 518 after an end of the first communication 510, but the second communication 512 is not expected to be transmitted before UE 305 has transmitted the feedback 712.

In some aspects, BS 110 may receive the feedback 712 on the PUCCH directly from UE 310, and BS 110 may recognize the feedback 712 as being from UE 310. A rule, shown by example 704, may specify that UE 305 is not expected to receive the second DCI 518 until after UE 305 has received the feedback 710 on the PSFCH or UE 310 has transmitted the feedback 712 to BS 110 on the PUCCH. BS 110 may expect to have information about a PSFCH pool configuration and to which UE the feedback 712 belongs. BS 110 may receive the feedback 712 from UE 310 on the PUCCH while UE 310 transmits the feedback 710 to UE 305 on the PSFCH. UE 305 may forward a priority indicator and/or a PSFCH-to-HARQ feedback timing indicator from DCI to UE 310 via SCI. UE 305 may use the feedback 710 from UE 310 on the PSFCH for HARQ buffer management. BS 110 may not transmit the second DCI 518 (another grant for the same HARQ ID) before BS 110 receives the feedback 712 from UE 310 on the PUCCH.

As indicated above, FIG. 7 provides some examples. Other examples may differ from what is described with regard to FIG. 7.

Figure 8:
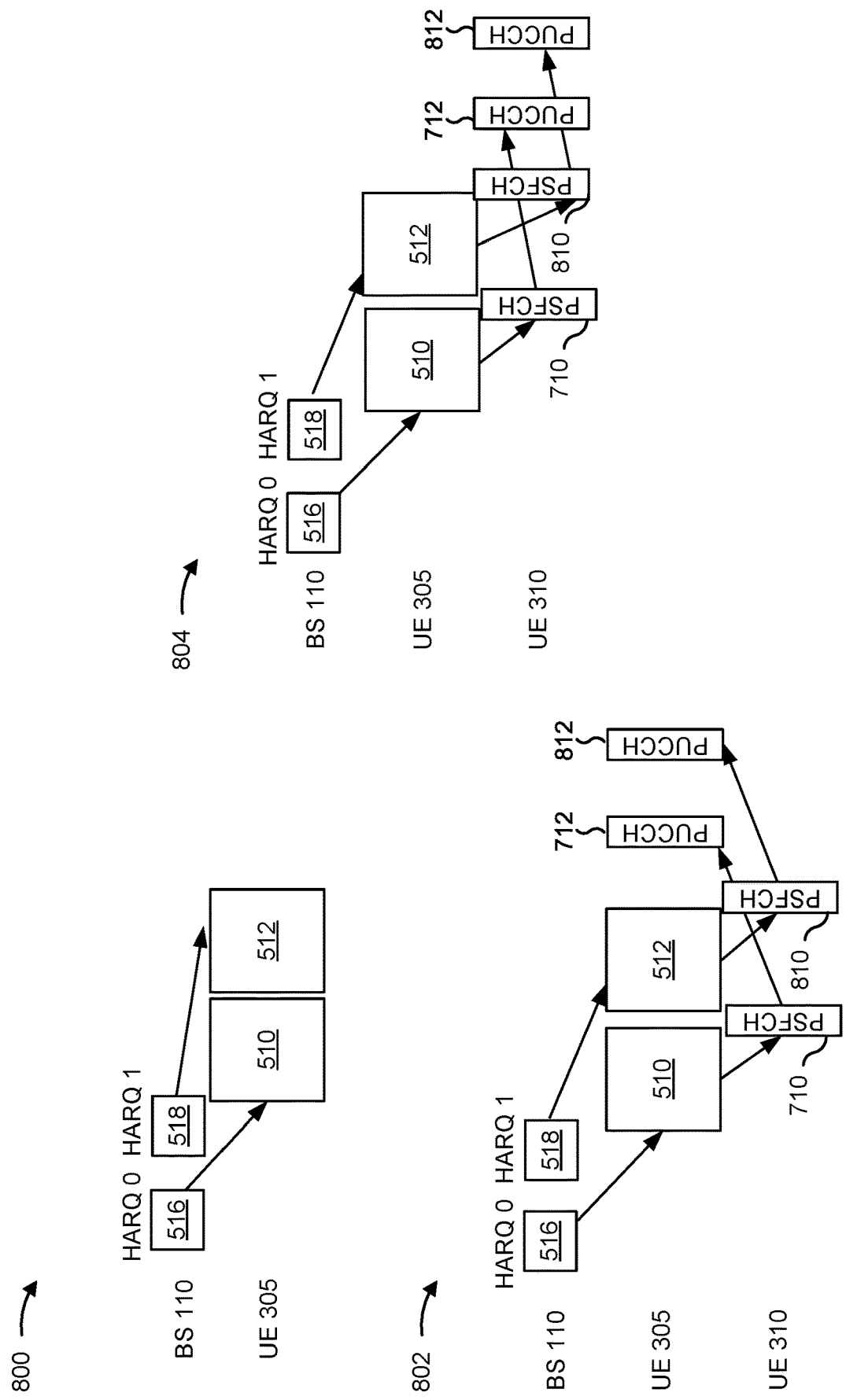
FIG. 8 is a diagram illustrating examples of a rule for ordering sidelink communications, in accordance with the present disclosure.

FIG. 8 is a diagram illustrating examples 800, 802, and 804 of a rule for ordering sidelink communications, in accordance with the present disclosure. Examples 800, 802, and 804 show a BS 110 that transmits DCI to UE 305. UE 305 may transmit communications scheduled by the DCI to UE 310.

In example 800, feedback may be disabled for UE 305, and the HARQ IDs for the DCI are different (HARQ 0 and HARQ 1). A rule may specify that UE 305 does not expect the second DCI 518 to schedule the second communication 512 earlier than the first communication 510. UE 305 may not expect an OoO scheduling delay from DCI.

In examples 802 and 804, feedback may be enabled for UE 305, and the HARQ IDs for the DCI are different (HARQ 0 and HARQ 1). UE 305 may receive feedback 810 for the second communication 512 from UE 310 on the PSFCH, and UE 305 may transmit the feedback 812 for the second communication 512 to BS 110 on the PUCCH. Note that the feedback 812 is the same feedback as feedback 810, but the feedback 810 is transmitted on the PSFCH and the feedback 812 is transmitted on the PUCCH. In some aspects, a rule, shown by example 802, may specify that UE 305 is not expected to transmit the feedback 812 for the second communication 512 to BS 110 on the PUCCH before UE 305 transmits the feedback 712 for the first communication 510 to BS 110 on the PUCCH. That is, UE 305 may operate using an OoO scheduling rule and an OoO HARQ timing rule.

In example 804, BS 110 may receive the feedback 712 and 812 directly from UE 310, and BS 110 may recognize the feedback 712 and 812 as being from UE 310. A rule, shown by example 804, may specify that UE 305 is not expected to receive the second DCI 518 until after the first DCI 516, and the feedback 812 for the second communication 512 is not expected to be transmitted on the PUCCH until the feedback 712 for the first communication 510 is transmitted.

As indicated above, FIG. 8 provides some examples. Other examples may differ from what is described with regard to FIG. 8.

Figure 9:
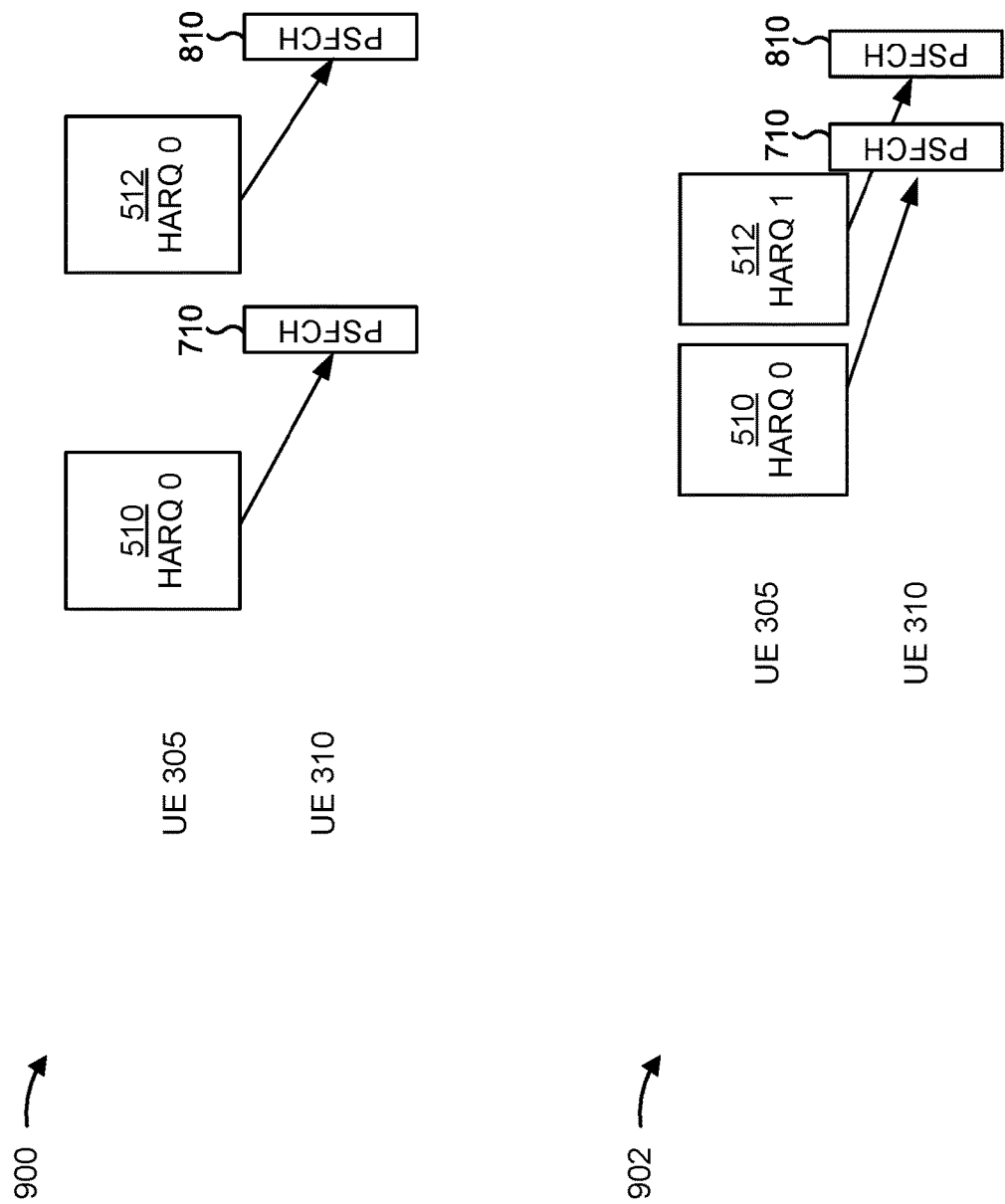
FIG. 9 is a diagram illustrating examples of a rule for ordering sidelink communications, in accordance with the present disclosure.

FIG. 9 is a diagram illustrating examples 900 and 902 of a rule for ordering sidelink communications, in accordance with the present disclosure. Examples 900 and 902 show that UE 310 may transmit feedback for communications received from UE 305.

UE 305 may receive, in some aspects, a PSFCH timing indication from BS 110 on the PSCCH. The PSFCH timing indication may provide for more flexible timing, but may still be restricted by a rule for ordering. In example 900, feedback may be enabled for UE 305, and the HARQ IDs for the DCI may be the same (HARQ 0). A rule may specify that UE 310 is not expected to receive the second communication 512 until UE 310 has transmitted the feedback 710 for the first communication to UE 305 on the PSFCH. UE 305 may expect the feedback 710 on the PSFCH before scheduling a new transport block or rescheduling a transmission (in sidelink Mode 2).

In example 902, the HARQ IDs for the DCI are different (HARQ 0 and HARQ 1). A rule may specify that UE 310 is not expected to transmit the feedback 810 for the second communication 512 on the PSFCH until UE 310 has transmitted the feedback 710 for the first communication to UE 305 on the PSFCH. The second communication 512 may be received before transmitting the feedback 710 for the first communication 510.

As indicated above, FIG. 9 provides some examples. Other examples may differ from what is described with regard to FIG. 9.

Figure 10:
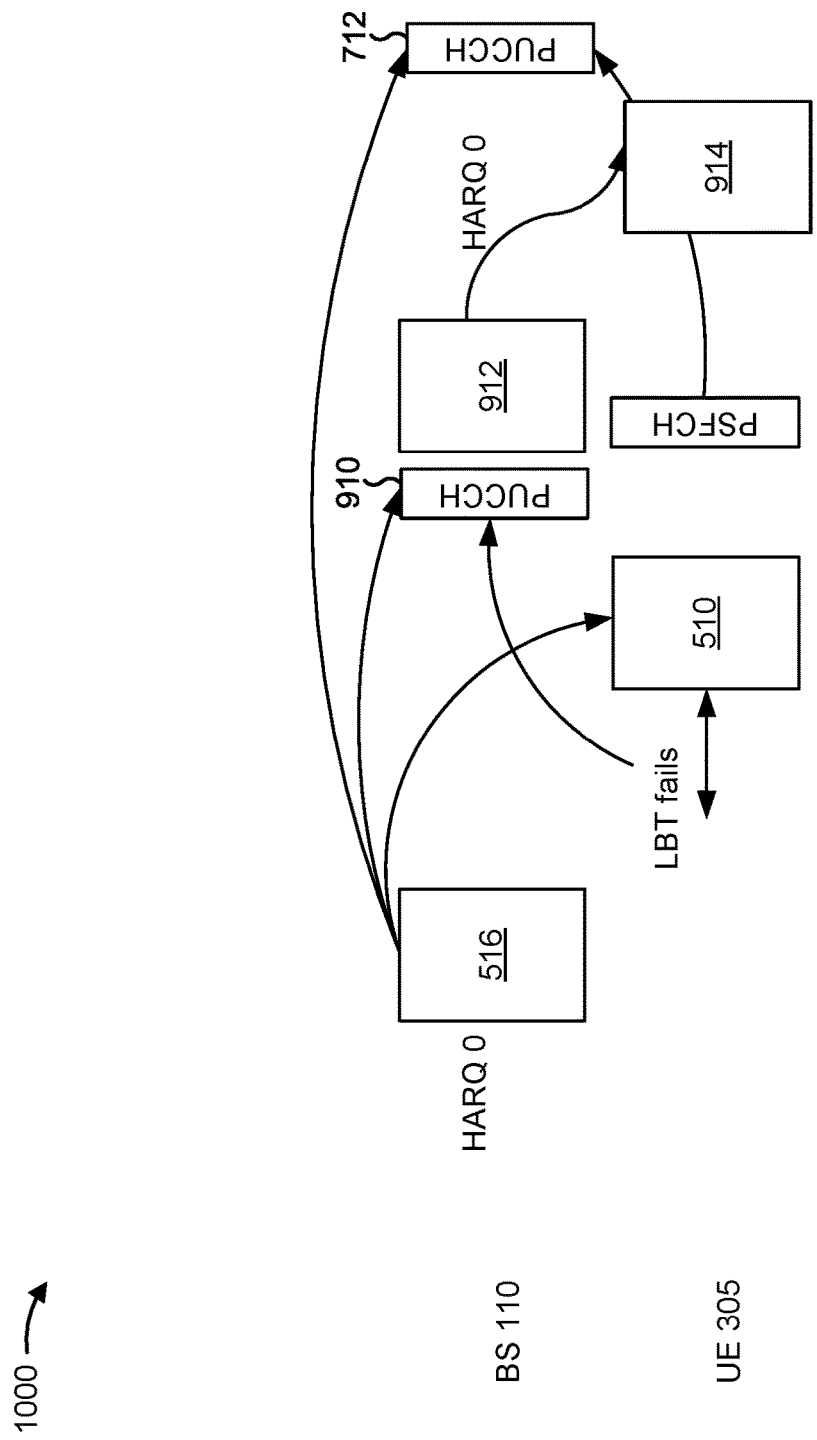
FIG. 10 is a diagram illustrating an example of a rule for ordering sidelink communications, in accordance with the present disclosure.

FIG. 10 is a diagram illustrating an example 1000 of a rule for ordering sidelink communications, in accordance with the present disclosure. Example 1000 shows that BS 110 may transmit DCI that schedules communications to be transmitted by UE 305.

In a shared or unlicensed frequency band, a transmitting device may contend against other devices for channel access before transmitting on a shared or unlicensed channel to reduce and/or prevent collisions on the shared or unlicensed channel. To contend for channel access, the transmitting device may perform a channel access procedure, such as an LBT procedure. The LBT procedure may be performed to determine whether the physical channel (e.g., the radio resources of the channel) is free to use or busy (e.g., in use by another wireless communication device). The LBT procedure may include sensing or measuring the physical channel (e.g., performing an RSRP measurement, detecting an energy level, or performing another type of measurement) during a channel access gap, and determining whether the shared or unlicensed channel is free or busy based at least in part on the signals sensed or measured on the physical channel (e.g., based at least in part on whether the measurement satisfies a threshold). If the transmitting device determines that the LBT procedure was successful, the transmitting device may perform one or more transmissions on the shared or unlicensed channel during a transmission opportunity, which may extend for a channel occupancy time (COT). The transmitting device may provide an LBT report of failure or success. UE 305 may perform LBT and transmit LBT reports to BS 110.

In some aspects, UE 305 may transmit an early LBT report 910 on the PUCCH if there is an LBT failure. BS 110 may use DCI 912 to reschedule UE 305 for a retransmission 914 (same HARQ ID) before the feedback 712 for the first communication 510 is received. With LBT failure, UE 305 may expect to wait for a retransmission grant. The DCI 912 may be an additional grant for a retransmission, or the first DCI 516 may indicate up to two retransmission resources.

If feedback is enabled (for the same HARQ ID) and early LBT reporting is enabled, a rule may specify that if UE 305 fails LBT before the first communication 510, UE 305 is not expected to receive another DCI 912 until UE 305 has transmitted the early LBT report on the PUCCH. If LBT is successful, UE 305 does not deviate from a regular procedure. That is, UE 305 is not expected to receive another DCI 912 until UE 305 has transmitted the feedback 712 on the PUCCH. While UE 305 may use the DCI 912 for a retransmission, in some aspects, UE 305 may use the DCI 912 for a new transmission by toggling a new data indicator.

By specifying rules on the sidelink for receiving DCI, for transmitting communications, and for providing feedback, UE 305 and UE 310 may avoid out of order communications, unexpected overlapping, and other collisions that degrade communications. As a result, BS 110, UE 305, and UE 310 may conserve processing resources and signaling resources that would otherwise be consumed with retransmissions.

As indicated above, FIG. 10 is provided as an example. Other examples may differ from what is described with regard to FIG. 10.

Figure 11:
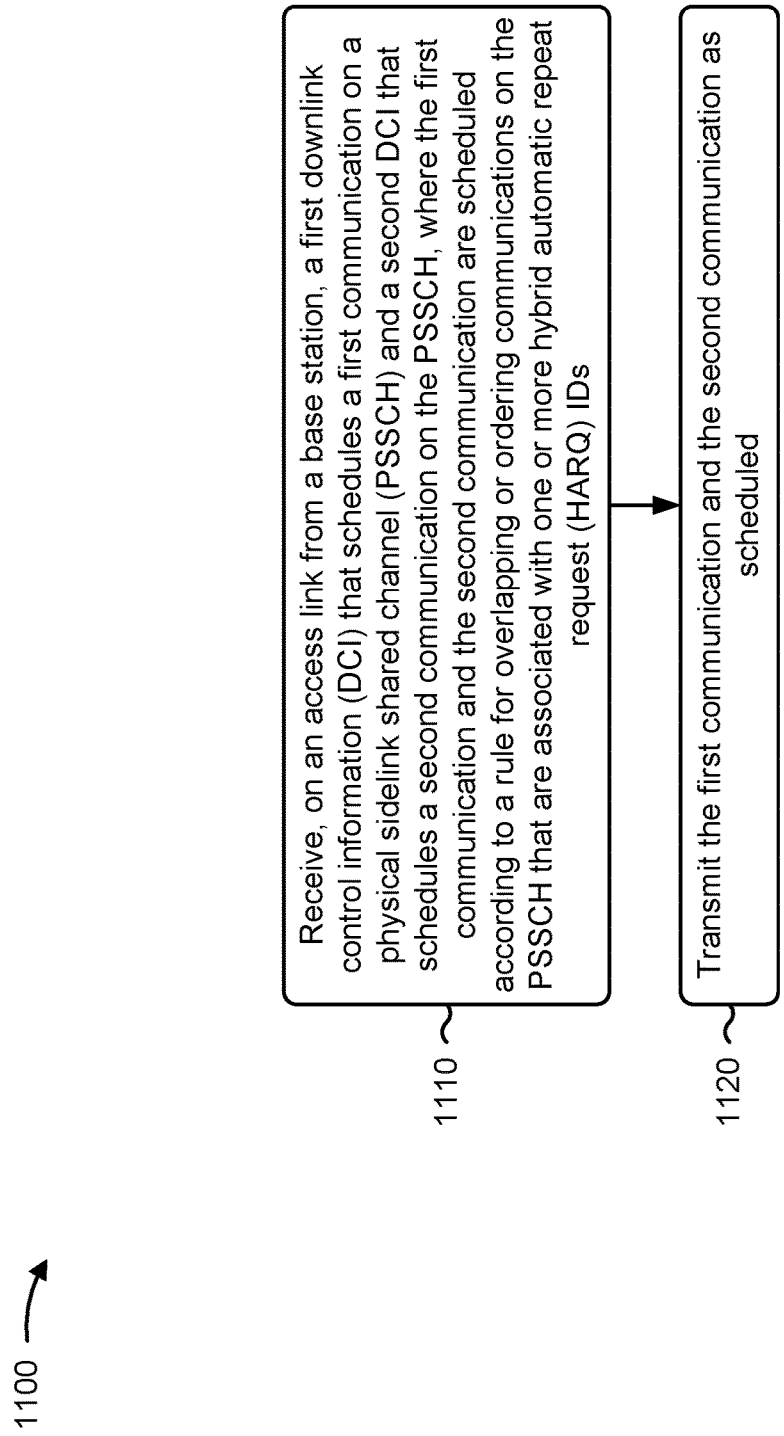
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120, UE 305) performs operations associated with ordering sidelink communications.

As shown in FIG. 11, in some aspects, process 1100 may include receiving, on an access link from a base station, a first DCI that schedules a first communication on a PSSCH and a second DCI that schedules a second communication on the PSSCH (block 1110). For example, the UE (e.g., using communication manager 140 and/or reception component 1402 depicted in FIG. 14) may receive, on an access link from a base station, a first DCI that schedules a first communication on a PSSCH and a second DCI that schedules a second communication on the PSSCH, as described above. In some aspects, the first communication and the second communication are scheduled according to a rule for overlapping or ordering communications on the PSSCH that are associated with one or more HARQ IDs.

As further shown in FIG. 11, in some aspects, process 1100 may include transmitting the first communication and the second communication as scheduled (block 1120). For example, the UE (e.g., using communication manager 140 and/or transmission component 1404 depicted in FIG. 14) may transmit the first communication and the second communication as scheduled, as described above.

Process 1100 may include additional aspects, such as any single aspect or any combination of aspects described below and/or in connection with one or more other processes described elsewhere herein.

In a first aspect, the rule specifies that the first communication and the second communication are not to overlap in time on the PSSCH.

In a second aspect, alone or in combination with the first aspect, the rule specifies that the first communication and the second communication are able to overlap in time on the PSSCH if a HARQ ID for the first communication is different than a HARQ ID for the second communication and if a receiving UE that received the first communication is different than a receiving UE that received the second communication.

In a third aspect, alone or in combination with one or more of the first and second aspects, feedback is disabled and the first DCI and the second DCI are for a same HARQ ID, and the rule specifies that the second DCI is after the first communication and before the second communication.

In a fourth aspect, alone or in combination with one or more of the first through third aspects, feedback is disabled and the first DCI and the second DCI are for a same HARQ ID, and the rule specifies that the first communication is after the second DCI, and the second communication is after the first communication.

In a fifth aspect, alone or in combination with one or more of the first through fourth aspects, feedback is enabled and the first DCI and the second DCI are for a same HARQ ID, and the rule specifies that the second DCI is after feedback for the first communication is transmitted to the base station.

In a sixth aspect, alone or in combination with one or more of the first through fifth aspects, feedback is enabled and the first DCI and the second DCI are for a same HARQ ID, and the rule specifies that the second DCI is after the first communication and before feedback for the first communication is transmitted to the base station, and that the second communication is after the feedback for the first communication is transmitted to the base station.

In a seventh aspect, alone or in combination with one or more of the first through sixth aspects, feedback is enabled and the first DCI and the second DCI are for a same HARQ ID, and the rule specifies that the second DCI is after feedback for the first communication is received from a receiving UE that received the first communication, or after the feedback for the first communication is transmitted to the base station.

In an eighth aspect, alone or in combination with one or more of the first through seventh aspects, feedback is disabled and the first DCI and the second DCI are for different HARQ IDs, and the rule specifies that the first communication is after the second DCI, and the second communication is after the first communication.

In a ninth aspect, alone or in combination with one or more of the first through eighth aspects, feedback is enabled and the first DCI and the second DCI are for different HARQ IDs, and the rule specifies that feedback for the first communication is to be transmitted to the base station before feedback for the second communication is transmitted to the base station.

In a tenth aspect, alone or in combination with one or more of the first through ninth aspects, feedback is enabled and the first DCI and the second DCI are for different HARQ IDs, and the rule specifies that feedback for the first communication is to be transmitted, by a receiving UE that received the first communication, to the base station before feedback for the second communication is transmitted, by a receiving UE that received the second communication, to the base station.

In an eleventh aspect, alone or in combination with one or more of the first through tenth aspects, feedback is enabled and the first DCI and the second DCI are for a same HARQ ID, and the rule specifies that the second communication is after feedback for the first communication is received, from a receiving UE that received the first communication, on a PSFCH.

In a twelfth aspect, alone or in combination with one or more of the first through eleventh aspects, feedback is enabled and the first DCI and the second DCI are for different HARQ IDs, and the rule specifies that the second communication is before feedback for the first communication is received, from a receiving UE that received the first communication, on a PSFCH.

In a thirteenth aspect, alone or in combination with one or more of the first through twelfth aspects, feedback and early LBT reporting are enabled and the first DCI and the second DCI are for a same HARQ ID, and the rule specifies that if LBT fails before the first communication is transmitted, the second DCI is not received until after an early LBT report is transmitted to the base station.

In a fourteenth aspect, alone or in combination with one or more of the first through thirteenth aspects, the UE is configured with multiple resource pools, and the rule is applied across the multiple resource pools.

In a fifteenth aspect, alone or in combination with one or more of the first through fourteenth aspects, the UE is configured with multiple resource pools, and the rule is applied per resource pool.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
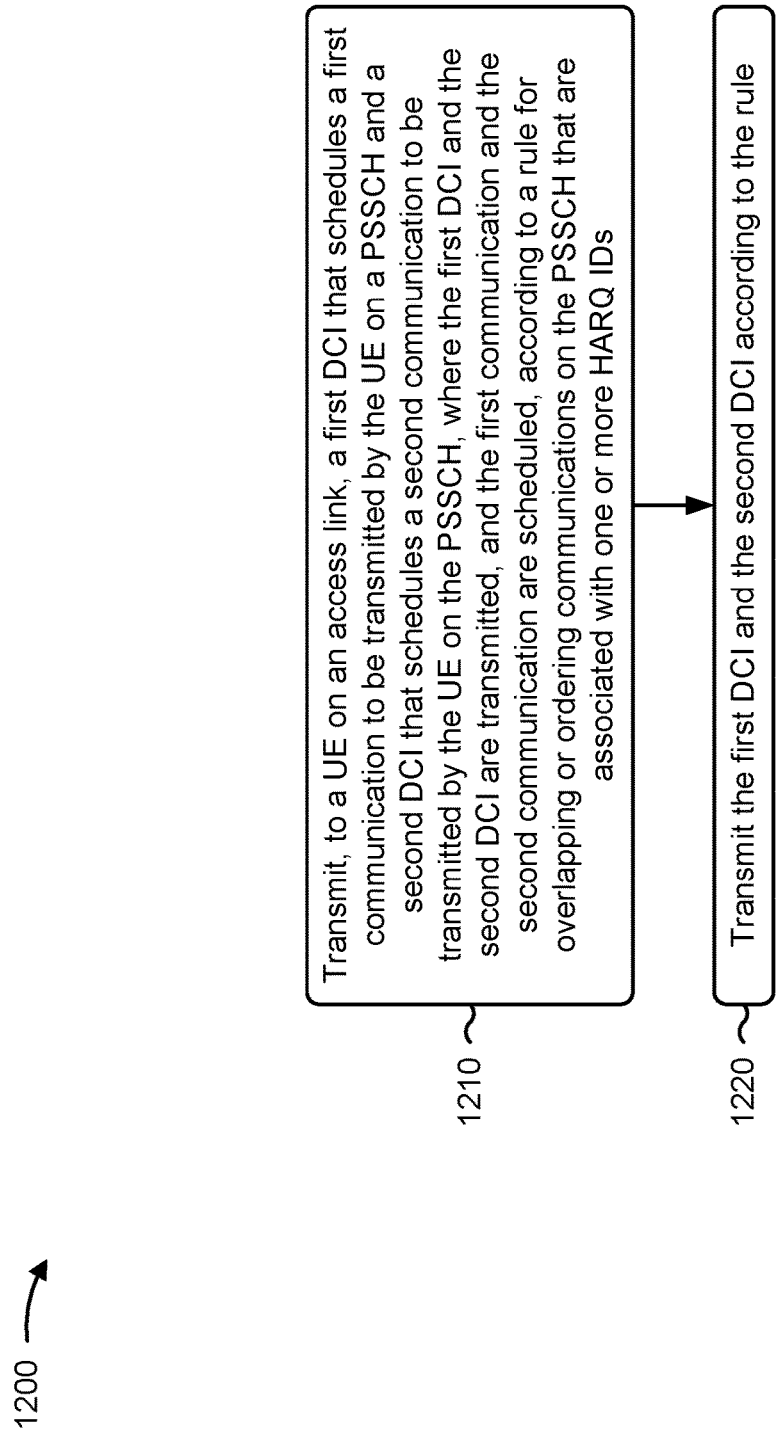
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., base station 110) performs operations associated with ordering sidelink communications.

As shown in FIG. 12, in some aspects, process 1200 may include transmitting, to a UE on an access link, a first DCI that schedules a first communication to be transmitted by the UE on a PSSCH and a second DCI that schedules a second communication to be transmitted by the UE on the PSSCH (block 1210). For example, the base station (e.g., using communication manager 150 and/or transmission component 1504 depicted in FIG. 15) may transmit, to a UE on an access link, a first DCI that schedules a first communication to be transmitted by the UE on a PSSCH and a second DCI that schedules a second communication to be transmitted by the UE on the PSSCH, as described above. In some aspects, the first DCI and the second DCI are transmitted, and the first communication and the second communication are scheduled, according to a rule for overlapping or ordering communications on the PSSCH that are associated with one or more HARQ IDs.

As further shown in FIG. 12, in some aspects, process 1200 may include transmitting the first DCI and the second DCI according to the rule (block 1220). For example, the base station (e.g., using communication manager 150 and/or transmission component 1504 depicted in FIG. 15) may transmit the first DCI and the second DCI according to the rule, as described above.

Process 1200 may include additional aspects, such as any single aspect or any combination of aspects described below and/or in connection with one or more other processes described elsewhere herein.

In a first aspect, the rule specifies that the first communication and the second communication are not to overlap in time on the PSSCH.

In a second aspect, alone or in combination with the first aspect, the rule specifies that the first communication and the second communication are able to overlap in time on the PSSCH if a HARQ ID for the first communication is different than a HARQ ID for the second communication and if a receiving UE that received the first communication is different than a receiving UE that received the second communication.

In a third aspect, alone or in combination with one or more of the first and second aspects, feedback is disabled and the first DCI and the second DCI are for a same HARQ ID, and the rule specifies that the second DCI is after the first communication and before the second communication.

In a fourth aspect, alone or in combination with one or more of the first through third aspects, feedback is disabled and the first DCI and the second DCI are for a same HARQ ID, and the rule specifies that the first communication is after the second DCI, and the second communication is after the first communication.

In a fifth aspect, alone or in combination with one or more of the first through fourth aspects, feedback is enabled and the first DCI and the second DCI are for a same HARQ ID, and the rule specifies that the second DCI is after feedback for the first communication is received from the UE.

In a sixth aspect, alone or in combination with one or more of the first through fifth aspects, feedback is enabled and the first DCI and the second DCI are for a same HARQ ID, and the rule specifies that the second DCI is after the first communication and before feedback for the first communication is received from the UE, and that the second communication is after the feedback for the first communication is received from the UE.

In a seventh aspect, alone or in combination with one or more of the first through sixth aspects, feedback is enabled and the first DCI and the second DCI are for a same HARQ ID, and the rule specifies that the second DCI is after feedback for the first communication is received by the UE, from a receiving UE that received the first communication, or after the feedback for the first communication is received by the base station.

In an eighth aspect, alone or in combination with one or more of the first through seventh aspects, feedback is disabled and the first DCI and the second DCI are for different HARQ IDs, and the rule specifies that the first communication is after the second DCI, and the second communication is after the first communication.

In a ninth aspect, alone or in combination with one or more of the first through eighth aspects, feedback is enabled and the first DCI and the second DCI are for different HARQ IDs, and the rule specifies that feedback for the first communication is to be received from the UE before feedback for the second communication is received from the UE.

In a tenth aspect, alone or in combination with one or more of the first through ninth aspects, feedback is enabled and the first DCI and the second DCI are for different HARQ IDs, and the rule specifies that feedback for the first communication is to be received, from a receiving UE that received the first communication, before feedback for the second communication is received by a receiving UE that received the second communication.

In an eleventh aspect, alone or in combination with one or more of the first through tenth aspects, feedback is enabled and the first DCI and the second DCI are for a same HARQ ID, and the rule specifies that the second communication is after feedback for the first communication is received by the UE, from a receiving UE that received the first communication, on a PSFCH.

In a twelfth aspect, alone or in combination with one or more of the first through eleventh aspects, feedback is enabled and the first DCI and the second DCI are for different HARQ IDs, and the rule specifies that the second communication is before feedback for the first communication is received by the UE, from a receiving UE that received the first communication, on a PSFCH.

In a thirteenth aspect, alone or in combination with one or more of the first through twelfth aspects, feedback and early LBT reporting are enabled and the first DCI and the second DCI are for a same HARQ ID, and the rule specifies that if LBT fails before the first communication is transmitted, the second DCI is not transmitted until after an early LBT report is received from the UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
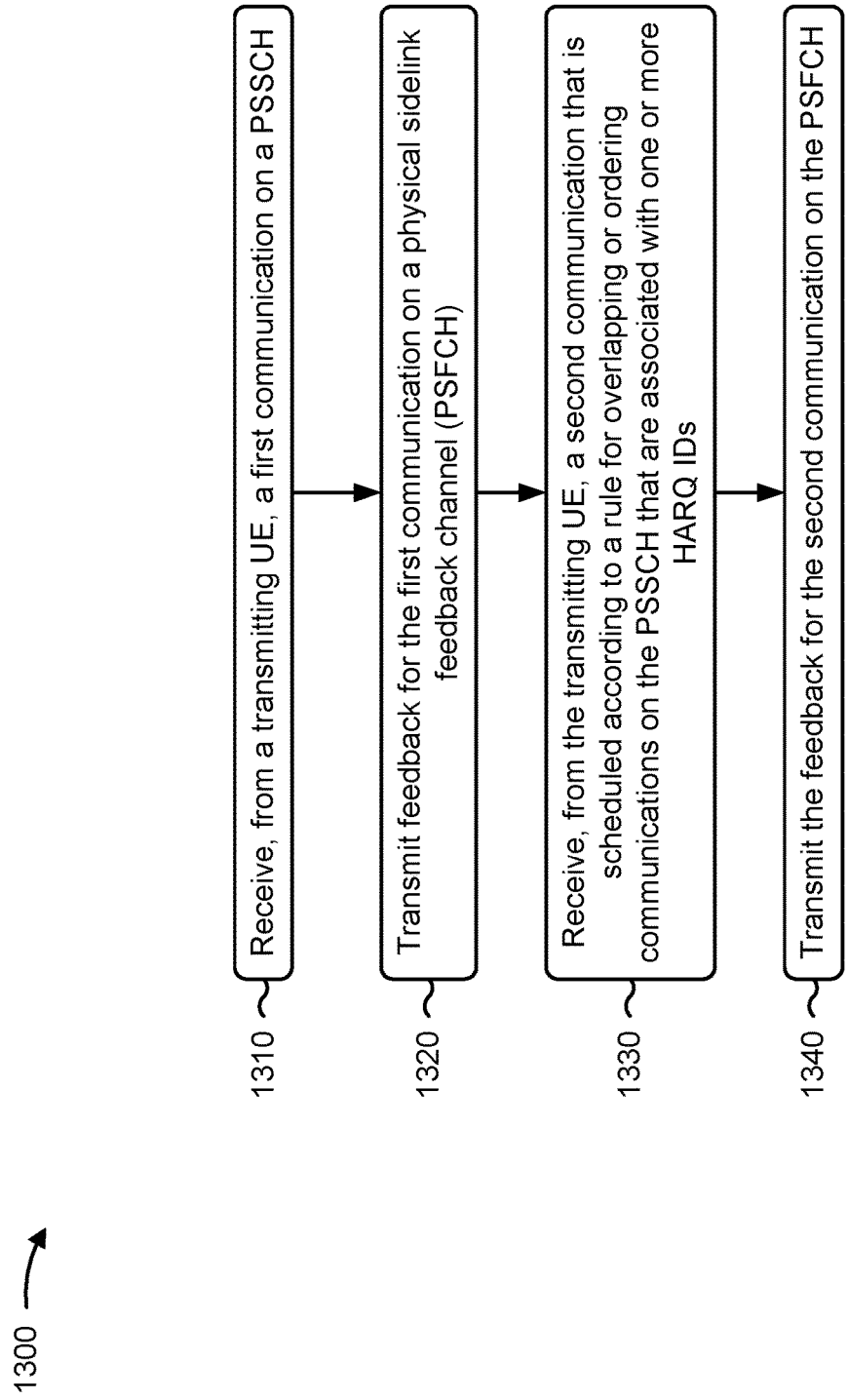
FIG. 13 is a diagram illustrating an example process performed, for example, by a UE, in accordance with the present disclosure.

FIG. 13 is a diagram illustrating an example process 1300 performed, for example, by a UE, in accordance with the present disclosure. Example process 1300 is an example where the UE (e.g., UE 120, UE 310) performs operations associated with ordering sidelink communications.

As shown in FIG. 13, in some aspects, process 1300 may include receiving, from a transmitting UE, a first communication on a PSSCH (block 1310). For example, the UE (e.g., using communication manager 140 and/or reception component 1602 depicted in FIG. 16) may receive, from a transmitting UE, a first communication on a PSSCH, as described above.

As further shown in FIG. 13, in some aspects, process 1300 may include transmitting feedback for the first communication on a PSFCH (block 1320). For example, the UE (e.g., using communication manager 140 and/or transmission component 1604 depicted in FIG. 16) may transmit feedback for the first communication on a PSFCH, as described above.

As further shown in FIG. 13, in some aspects, process 1300 may include receiving, from the transmitting UE, a second communication that is scheduled according to a rule for overlapping or ordering communications on the PSSCH that are associated with one or more HARQ IDs (block 1330). For example, the UE (e.g., using communication manager 140 and/or reception component 1602 depicted in FIG. 16) may receive, from the transmitting UE, a second communication that is scheduled according to a rule for overlapping or ordering communications on the PSSCH that are associated with one or more HARQ IDs, as described above.

As further shown in FIG. 13, in some aspects, process 1300 may include transmitting the feedback for the second communication on the PSFCH (block 1340). For example, the UE (e.g., using communication manager 140 and/or transmission component 1604 depicted in FIG. 16) may transmit the feedback for the second communication on the PSFCH, as described above.

Process 1300 may include additional aspects, such as any single aspect or any combination of aspects described below and/or in connection with one or more other processes described elsewhere herein.

In a first aspect, the first communication and the second communication are for a same HARQ ID, and the rule specifies that the second communication is to be received after feedback for the first communication is transmitted.

In a second aspect, alone or in combination with the first aspect, the first communication and the second communication are for different HARQ IDs, and the rule specifies that the second communication is to be received before feedback for the first communication is transmitted.

Process 1300 may include receiving and using the same rule used for process 1100, and process 1100 may include receiving and using the same rule used for process 1300. The rule used by the UE in process 1100 and the UE in process 1300 may be received from the base station described in connection with process 1200. In some aspects, process 1100 may include any of the blocks or aspects described in connection with process 1300, and process 1300 may include any of the blocks or aspects described in connection with process 1100. For example, in some aspects, process 1100 may further include receiving a third communication on a PSSCH, transmitting feedback for the third communication on a PSFCH, receiving a fourth communication that is scheduled according to the rule for overlapping or ordering communications on the PSSCH that are associated with the one or more HARQ IDs, and transmitting the feedback for the second communication on the PSFCH. In some aspects, the third communication and the fourth communication may be for the same HARQ ID, and the rule specifies that the fourth communication is to be received after feedback for the third communication is transmitted. In some aspects, the third communication and the fourth communication may be for different HARQ IDs, and the rule specifies that the fourth communication is to be received before feedback for the third communication is transmitted.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
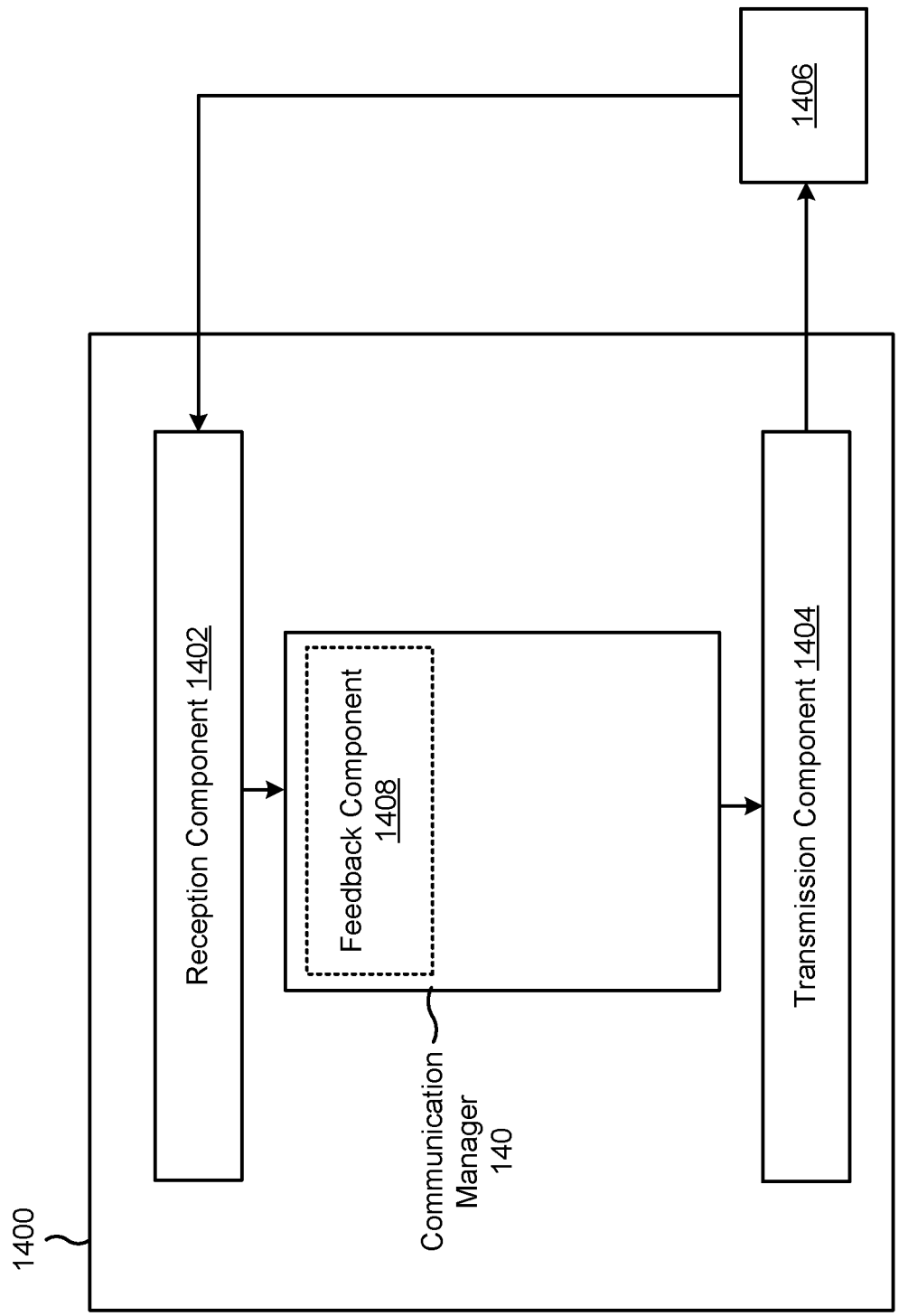
FIGS. 14-16 are block diagrams of example apparatuses for wireless communication, in accordance with the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1100 may include the communication manager 140. The communication manager 140 may include a feedback component 1408, among other examples.

In some aspects, the apparatus 1400 may be configured to perform one or more operations described herein in connection with FIGS. 1-10. Additionally, or alternatively, the apparatus 1400 may be configured to perform one or more processes described herein, such as process 1100 of FIG. 11. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The reception component 1402 may receive, on an access link from a base station, a first DCI that schedules a first communication on a PSSCH and a second DCI that schedules a second communication on the PSSCH, where the first communication and the second communication are scheduled according to a rule for overlapping or ordering communications on the PSSCH that are associated with one or more HARQ IDs. The transmission component 1404 may transmit the first communication and the second communication as scheduled. The feedback component 1408 and the reception component 1402 may receive feedback for the first communication and/or the second communication. The feedback component 1408 and the transmission component 1404 may transmit the feedback to the base station.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
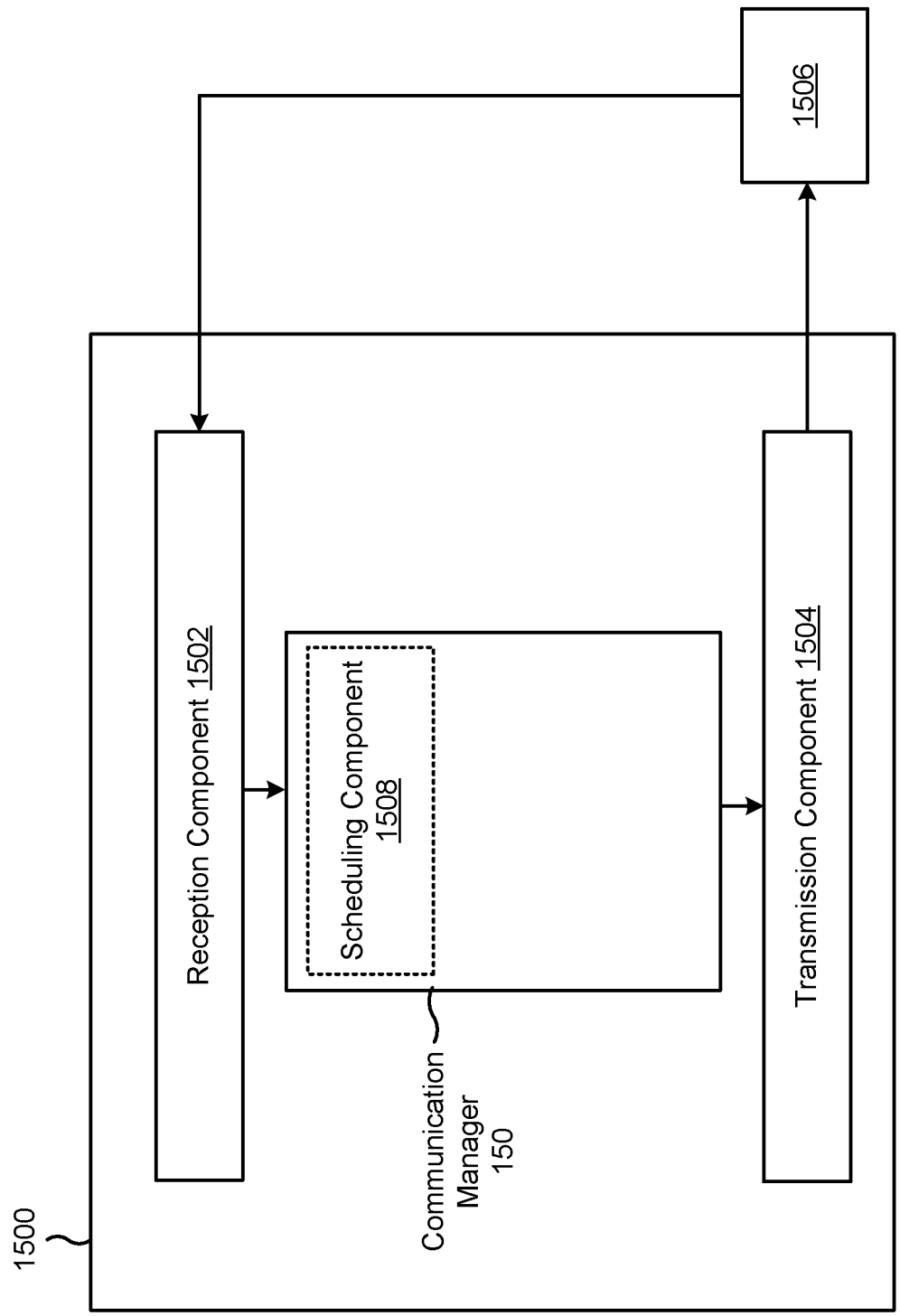

FIG. 15 is a block diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1100 may include the communication manager 150. The communication manager 150 may include a scheduling component 1508, among other examples.

In some aspects, the apparatus 1500 may be configured to perform one or more operations described herein in connection with FIGS. 1-10. Additionally, or alternatively, the apparatus 1500 may be configured to perform one or more processes described herein, such as process 1200 of FIG. 12. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver.

The transmission component 1504 may transmit, to a UE on an access link, a first DCI that schedules a first communication to be transmitted by the UE on a physical sidelink shared channel (PSSCH) and a second DCI that schedules a second communication to be transmitted by the UE on the PSSCH, where the first DCI and the second DCI are transmitted. The scheduling component 1508 may schedule the first DCI, the second DCI, the first communication, and the second communication according to a rule for overlapping or ordering communications on the PSSCH that are associated with one or more HARQ IDs. The transmission component 1504 may transmit the first DCI and the second DCI according to the rule.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
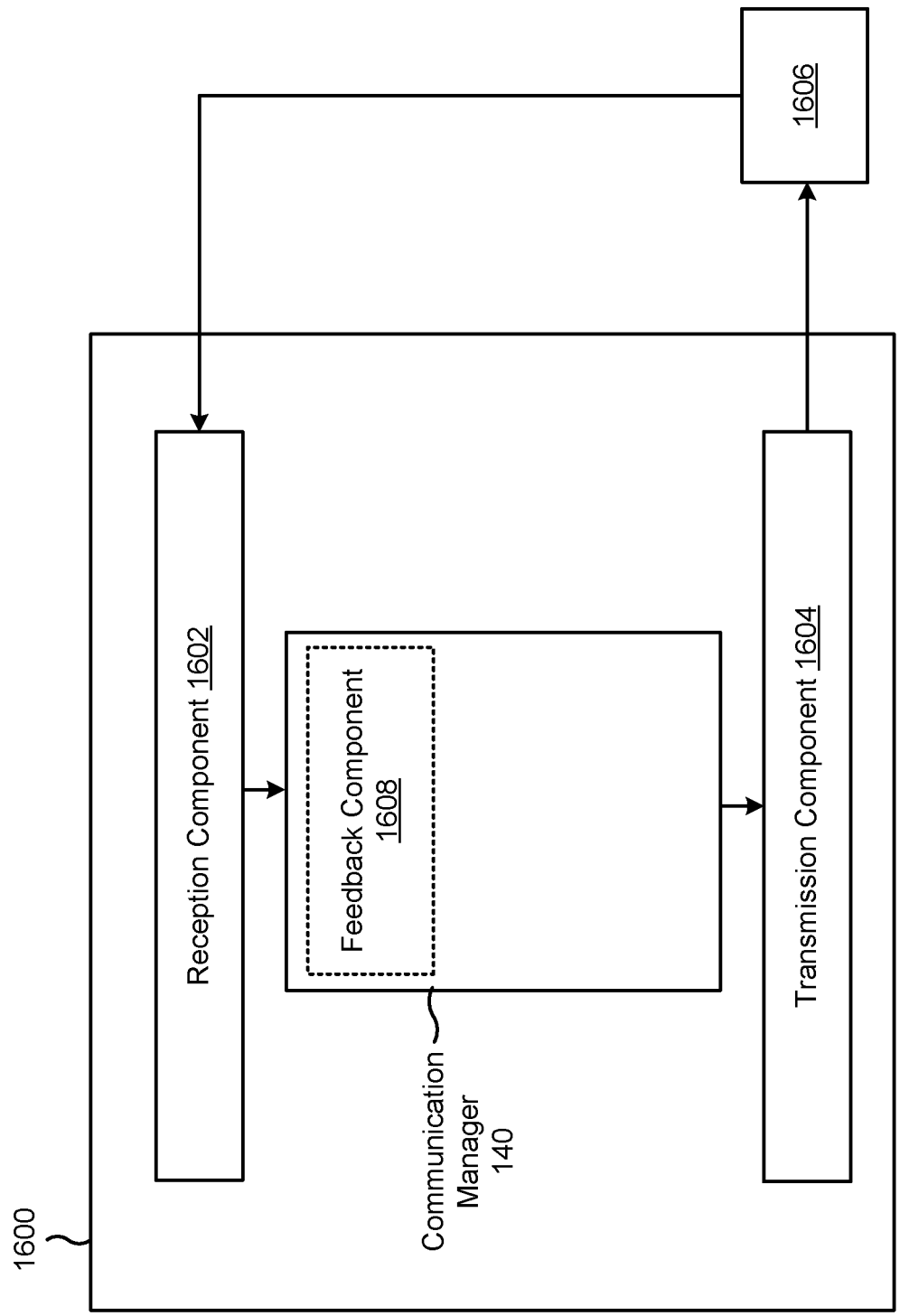

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1100 may include the communication manager 140. The communication manager 140 may include a feedback component 1608, among other examples.

In some aspects, the apparatus 1600 may be configured to perform one or more operations described herein in connection with FIGS. 1-10. Additionally, or alternatively, the apparatus 1600 may be configured to perform one or more processes described herein, such as process 1300 of FIG. 13. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

The reception component 1602 may receive, from a transmitting UE, a first communication on a PSSCH. The feedback component 1608 and the transmission component 1604 may transmit feedback for the first communication on a PSFCH. The reception component 1602 may receive, from the transmitting UE, a second communication that is scheduled according to a rule for overlapping or ordering communications on the PSSCH that are associated with one or more HARQ IDs. The transmission component 1604 may transmit the feedback for the second communication on the PSFCH.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving, on an access link from a base station, a first downlink control information (DCI) that schedules a first communication on a physical sidelink shared channel (PSSCH) and a second DCI that schedules a second communication on the PSSCH, wherein the first communication and the second communication are scheduled according to a rule for overlapping or ordering communications on the PSSCH that are associated with one or more hybrid automatic repeat request (HARQ) identifiers (IDs); and transmitting the first communication and the second communication as scheduled.

Aspect 2: The method of Aspect 1, wherein the rule specifies that the first communication and the second communication are not to overlap in time on the PSSCH.

Aspect 3: The method of Aspect 1, wherein the rule specifies that the first communication and the second communication are able to overlap in time on the PSSCH if a HARQ ID for the first communication is different than a HARQ ID for the second communication and if a receiving UE that received the first communication is different than a receiving UE that received the second communication.

Aspect 4: The method of any of Aspects 1-3, wherein feedback is disabled and the first DCI and the second DCI are for a same HARQ ID, and wherein the rule specifies that the second DCI is after the first communication and before the second communication.

Aspect 5: The method of any of Aspects 1-3, wherein feedback is disabled and the first DCI and the second DCI are for a same HARQ ID, and wherein the rule specifies that the first communication is after the second DCI, and the second communication is after the first communication.

Aspect 6: The method of any of Aspects 1-3, wherein feedback is enabled and the first DCI and the second DCI are for a same HARQ ID, and wherein the rule specifies that the second DCI is after feedback for the first communication is transmitted to the base station.

Aspect 7: The method of any of Aspects 1-3, wherein feedback is enabled and the first DCI and the second DCI are for a same HARQ ID, and wherein the rule specifies that the second DCI is after the first communication and before feedback for the first communication is transmitted to the base station, and that the second communication is after the feedback for the first communication is transmitted to the base station.

Aspect 8: The method of any of Aspects 1-3, wherein feedback is enabled and the first DCI and the second DCI are for a same HARQ ID, and wherein the rule specifies that the second DCI is after feedback for the first communication is received from a receiving UE that received the first communication, or after the feedback for the first communication is transmitted to the base station.

Aspect 9: The method of any of Aspects 1-3, wherein feedback is disabled and the first DCI and the second DCI are for different HARQ IDs, and wherein the rule specifies that the first communication is after the second DCI, and the second communication is after the first communication.

Aspect 10: The method of any of Aspects 1-3, wherein feedback is enabled and the first DCI and the second DCI are for different HARQ IDs, and wherein the rule specifies that feedback for the first communication is to be transmitted to the base station before feedback for the second communication is transmitted to the base station.

Aspect 11: The method of any of Aspects 1-3, wherein feedback is enabled and the first DCI and the second DCI are for different HARQ IDs, and wherein the rule specifies that feedback for the first communication is to be transmitted, by a receiving UE that received the first communication, to the base station before feedback for the second communication is transmitted, by a receiving UE that received the second communication, to the base station.

Aspect 12: The method of any of Aspects 1-3, wherein feedback is enabled and the first DCI and the second DCI are for a same HARQ ID, and wherein the rule specifies that the second communication is after feedback for the first communication is received, from a receiving UE that received the first communication, on a physical sidelink feedback channel.

Aspect 13: The method of any of Aspects 1-3, wherein feedback is enabled and the first DCI and the second DCI are for different HARQ IDs, and wherein the rule specifies that the second communication is before feedback for the first communication is received, from a receiving UE that received the first communication, on a physical sidelink feedback channel.

Aspect 14: The method of any of Aspects 1-3, wherein feedback and early listen before talk (LBT) reporting are enabled and the first DCI and the second DCI are for a same HARQ ID, and wherein the rule specifies that if LBT fails before the first communication is transmitted, the second DCI is not received until after an early LBT report is transmitted to the base station.

Aspect 15: The method of any of Aspects 1-14, wherein the UE is configured with multiple resource pools, and wherein the rule is applied across the multiple resource pools.

Aspect 16: The method of any of Aspects 1-14, wherein the UE is configured with multiple resource pools, and wherein the rule is applied per resource pool.

Aspect 17: A method of wireless communication performed by a base station, comprising: transmitting, to a user equipment (UE) on an access link, a first downlink control information (DCI) that schedules a first communication to be transmitted by the UE on a physical sidelink shared channel (PSSCH) and a second DCI that schedules a second communication to be transmitted by the UE on the PSSCH, wherein the first DCI and the second DCI are transmitted, and the first communication and the second communication are scheduled, according to a rule for overlapping or ordering communications on the PSSCH that are associated with one or more hybrid automatic repeat request (HARQ) identifiers (IDs); and transmitting the first DCI and the second DCI according to the rule.

Aspect 18: The method of Aspect 17, wherein the rule specifies that the first communication and the second communication are not to overlap in time on the PSSCH.

Aspect 19: The method of Aspect 17, wherein the rule specifies that the first communication and the second communication are able to overlap in time on the PSSCH if a HARQ ID for the first communication is different than a HARQ ID for the second communication and if a receiving UE that received the first communication is different than a receiving UE that received the second communication.

Aspect 20: The method of Aspect 17, wherein feedback is disabled and the first DCI and the second DCI are for a same HARQ ID, and wherein the rule specifies that the second DCI is after the first communication and before the second communication.

Aspect 21: The method of Aspect 17, wherein feedback is disabled and the first DCI and the second DCI are for a same HARQ ID, and wherein the rule specifies that the first communication is after the second DCI, and the second communication is after the first communication.

Aspect 22: The method of Aspect 17, wherein feedback is enabled and the first DCI and the second DCI are for a same HARQ ID, and wherein the rule specifies that the second DCI is after feedback for the first communication is received from the UE.

Aspect 23: The method of Aspect 17, wherein feedback is enabled and the first DCI and the second DCI are for a same HARQ ID, and wherein the rule specifies that the second DCI is after the first communication and before feedback for the first communication is received from the UE, and that the second communication is after the feedback for the first communication is received from the UE.

Aspect 24: The method of Aspect 17, wherein feedback is enabled and the first DCI and the second DCI are for a same HARQ ID, and wherein the rule specifies that the second DCI is after feedback for the first communication is received by the UE, from a receiving UE that received the first communication, or after the feedback for the first communication is received by the base station.

Aspect 25: The method of Aspect 17, wherein feedback is disabled and the first DCI and the second DCI are for different HARQ IDs, and wherein the rule specifies that the first communication is after the second DCI, and the second communication is after the first communication.

Aspect 26: The method of Aspect 17, wherein feedback is enabled and the first DCI and the second DCI are for different HARQ IDs, and wherein the rule specifies that feedback for the first communication is to be received from the UE before feedback for the second communication is received from the UE.

Aspect 27: The method of Aspect 17, wherein feedback is enabled and the first DCI and the second DCI are for different HARQ IDs, and wherein the rule specifies that feedback for the first communication is to be received, from a receiving UE that received the first communication, before feedback for the second communication is received by a receiving UE that received the second communication.

Aspect 28: The method of Aspect 17, wherein feedback is enabled and the first DCI and the second DCI are for a same HARQ ID, and wherein the rule specifies that the second communication is after feedback for the first communication is received by the UE, from a receiving UE that received the first communication, on a physical sidelink feedback channel.

Aspect 29: The method of Aspect 17, wherein feedback is enabled and the first DCI and the second DCI are for different HARQ IDs, and wherein the rule specifies that the second communication is before feedback for the first communication is received by the UE, from a receiving UE that received the first communication, on a physical sidelink feedback channel.

Aspect 30: The method of Aspect 17, wherein feedback and early listen before talk (LBT) reporting are enabled and the first DCI and the second DCI are for a same HARQ ID, and wherein the rule specifies that if LBT fails before the first communication is transmitted, the second DCI is not transmitted until after an early LBT report is received from the UE.

Aspect 31: A method of wireless communication performed by a user equipment (UE), comprising: receiving, from a transmitting UE, a first communication on a physical sidelink shared channel (PSSCH); transmitting feedback for the first communication on a physical sidelink feedback channel (PSFCH); and receiving, from the transmitting UE, a second communication that is scheduled according to a rule for overlapping or ordering communications on the PSSCH that are associated with one or more hybrid automatic repeat request (HARQ) identifiers (IDs); and transmitting the feedback for the second communication on the PSFCH.

Aspect 32: The method of Aspect 31, wherein the first communication and the second communication are for a same HARQ ID, and wherein the rule specifies that the second communication is to be received after feedback for the first communication is transmitted.

Aspect 33: The method of Aspect 31, wherein the first communication and the second communication are for different HARQ IDs, and wherein the rule specifies that the second communication is to be received before feedback for the first communication is transmitted.

Aspect 34: The method of Aspect 1, further comprising: receiving, from a transmitting UE, a third communication on a physical sidelink shared channel (PSSCH); transmitting feedback for the third communication on a physical sidelink feedback channel (PSFCH); and receiving, from the transmitting UE, a fourth communication that is scheduled according to a rule for overlapping or ordering communications on the PSSCH that are associated with one or more hybrid automatic repeat request (HARQ) identifiers (IDs); and transmitting the feedback for the fourth communication on the PSFCH.

Aspect 35: The method of Aspect 34, wherein the third communication and the fourth communication are for a same HARQ ID, and wherein the rule specifies that the fourth communication is to be received after feedback for the third communication is transmitted.

Aspect 36: The method of Aspect 34, wherein the third communication and the fourth communication are for different HARQ IDs, and wherein the rule specifies that the fourth communication is to be received before feedback for the third communication is transmitted.

Aspect 37: An apparatus for wireless communication at a device, comprising a processor; memory coupled with the processor; and instructions stored in the memory and executable by the processor to cause the apparatus to perform the method of one or more of Aspects 1-36.

Aspect 38: A device for wireless communication, comprising a memory and one or more processors coupled to the memory, the memory and the one or more processors configured to perform the method of one or more of Aspects 1-36.

Aspect 39: An apparatus for wireless communication, comprising at least one means for performing the method of one or more of Aspects 1-36.

Aspect 40: A non-transitory computer-readable medium storing code for wireless communication, the code comprising instructions executable by a processor to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive, on an access link from a base station, a first downlink control information (DCI) that schedules a first communication on a physical sidelink shared channel (PSSCH) and a second DCI that schedules a second communication on the PSSCH, wherein the first communication and the second communication are scheduled according to a rule for overlapping or ordering communications on the PSSCH that are associated with one or more hybrid automatic repeat request (HARQ) identifiers (IDs); and
        transmit the first communication and the second communication as scheduled.

2. The UE of claim 1, wherein the rule specifies that the first communication and the second communication are not to overlap in time on the PSSCH.

3. The UE of claim 1, wherein the rule specifies that the first communication and the second communication are able to overlap in time on the PSSCH if a HARQ ID for the first communication is different than a HARQ ID for the second communication and if a receiving UE that received the first communication is different than a receiving UE that received the second communication.

4. The UE of claim 1, wherein feedback is disabled and the first DCI and the second DCI are for a same HARQ ID, and wherein the rule specifies that the second DCI is after the first communication and before the second communication.

5. The UE of claim 1, wherein feedback is disabled and the first DCI and the second DCI are for a same HARQ ID, and wherein the rule specifies that the first communication is after the second DCI, and the second communication is after the first communication.

6. The UE of claim 1, wherein feedback is enabled and the first DCI and the second DCI are for a same HARQ ID, and wherein the rule specifies that the second DCI is after feedback for the first communication is transmitted to the base station.

7. The UE of claim 1, wherein feedback is enabled and the first DCI and the second DCI are for a same HARQ ID, and wherein the rule specifies that the second DCI is after the first communication and before feedback for the first communication is transmitted to the base station, and that the second communication is after the feedback for the first communication is transmitted to the base station.

8. The UE of claim 1, wherein feedback is enabled and the first DCI and the second DCI are for a same HARQ ID, and wherein the rule specifies that the second DCI is after feedback for the first communication is received from a receiving UE that received the first communication, or after the feedback for the first communication is transmitted to the base station.

9. The UE of claim 1, wherein feedback is disabled and the first DCI and the second DCI are for different HARQ IDs, and wherein the rule specifies that the first communication is after the second DCI, and the second communication is after the first communication.

10. The UE of claim 1, wherein feedback is enabled and the first DCI and the second DCI are for different HARQ IDs, and wherein the rule specifies that feedback for the first communication is to be transmitted to the base station before feedback for the second communication is transmitted to the base station.

11. The UE of claim 1, wherein feedback is enabled and the first DCI and the second DCI are for different HARQ IDs, and wherein the rule specifies that feedback for the first communication is to be transmitted, by a receiving UE that received the first communication, to the base station before feedback for the second communication is transmitted, by a receiving UE that received the second communication, to the base station.

12. The UE of claim 1, wherein feedback is enabled and the first DCI and the second DCI are for a same HARQ ID, and wherein the rule specifies that the second communication is after feedback for the first communication is received, from a receiving UE that received the first communication, on a physical sidelink feedback channel.

13. The UE of claim 1, wherein feedback is enabled and the first DCI and the second DCI are for different HARQ IDs, and wherein the rule specifies that the second communication is before feedback for the first communication is received, from a receiving UE that received the first communication, on a physical sidelink feedback channel.

14. The UE of claim 1, wherein feedback and early listen before talk (LBT) reporting are enabled and the first DCI and the second DCI are for a same HARQ ID, and wherein the rule specifies that if LBT fails before the first communication is transmitted, the second DCI is not received until after an early LBT report is transmitted to the base station.

15. The UE of claim 1, wherein the UE is configured with multiple resource pools, and wherein the rule is applied across the multiple resource pools.

16. The UE of claim 1, wherein the UE is configured with multiple resource pools, and wherein the rule is applied per resource pool.

17. A base station for wireless communication, comprising:
a memory; and
one or more processors, coupled to the memory, configured to:
transmit, to a user equipment (UE) on an access link, a first downlink control information (DCI) that schedules a first communication to be transmitted by the UE on a physical sidelink shared channel (PSSCH) and a second DCI that schedules a second communication to be transmitted by the UE on the PSSCH, wherein the first DCI and the second DCI are transmitted, and the first communication and the second communication are scheduled, according to a rule for overlapping or ordering communications on the PSSCH that are associated with one or more hybrid automatic repeat request (HARQ) identifiers (IDs); and
transmit the first DCI and the second DCI according to the rule.

18. The base station of claim 17, wherein the rule specifies that the first communication and the second communication are not to overlap in time on the PSSCH.

19. The base station of claim 17, wherein the rule specifies that the first communication and the second communication are able to overlap in time on the PSSCH if a HARQ ID for the first communication is different than a HARQ ID for the second communication and if a receiving UE that received the first communication is different than a receiving UE that received the second communication.

20. The base station of claim 17, wherein feedback is disabled and the first DCI and the second DCI are for a same HARQ ID, and wherein the rule specifies that:
the second DCI is after the first communication and before the second communication; or
the first communication is after the second DCI, and the second communication is after the first communication.

21. The base station of claim 17, wherein feedback is enabled and the first DCI and the second DCI are for a same HARQ ID, and wherein the rule specifies that:
the second DCI is after feedback for the first communication is received from the UE; or
the second DCI is after the first communication and before feedback for the first communication is received from the UE, and that the second communication is after the feedback for the first communication is received from the UE.

22. The base station of claim 17, wherein feedback is enabled and the first DCI and the second DCI are for a same HARQ ID, and wherein the rule specifies that the second DCI is after feedback for the first communication is received by the UE, from a receiving UE that received the first communication, or after the feedback for the first communication is received by the base station.

23. The base station of claim 17, wherein feedback is disabled and the first DCI and the second DCI are for different HARQ IDs, and wherein the rule specifies that the first communication is after the second DCI, and the second communication is after the first communication.

24. The base station of claim 17, wherein feedback is enabled and the first DCI and the second DCI are for different HARQ IDs, and wherein the rule specifies that:
feedback for the first communication is to be received from the UE before feedback for the second communication is received from the UE;
feedback for the first communication is to be received, from a receiving UE that received the first communication, before feedback for the second communication is received by a receiving UE that received the second communication; or
the second communication is before feedback for the first communication is received by the UE, from the receiving UE that received the first communication, on a physical sidelink feedback channel.

25. The base station of claim 17, wherein feedback is enabled and the first DCI and the second DCI are for a same HARQ ID, and wherein the rule specifies that the second communication is after feedback for the first communication is received by the UE, from a receiving UE that received the first communication, on a physical sidelink feedback channel.

26. The base station of claim 17, wherein feedback and early listen before talk (LBT) reporting are enabled and the first DCI and the second DCI are for a same HARQ ID, and wherein the rule specifies that if LBT fails before the first communication is transmitted, the second DCI is not transmitted until after an early LBT report is received from the UE.

27. A user equipment (UE) for wireless communication, comprising:
a memory; and
one or more processors, coupled to the memory, configured to:
receive, from a transmitting UE, a first communication on a physical sidelink shared channel (PSSCH);
transmit feedback for the first communication on a physical sidelink feedback channel (PSFCH); and
receive, from the transmitting UE, a second communication that is scheduled according to a rule for overlapping or ordering communications on the PSSCH that are associated with one or more hybrid automatic repeat request (HARQ) identifiers (IDs); and
transmit the feedback for the second communication on the PSFCH.

28. The UE of claim 27, wherein the first communication and the second communication are for a same HARQ ID, and wherein the rule specifies that the second communication is to be received after feedback for the first communication is transmitted.

29. The UE of claim 27, wherein the first communication and the second communication are for different HARQ IDs, and wherein the rule specifies that the second communication is to be received before feedback for the first communication is transmitted.

30. A method of wireless communication performed by a user equipment (UE), comprising:
receiving, on an access link from a base station, a first downlink control information (DCI) that schedules a first communication on a physical sidelink shared channel (PSSCH) and a second DCI that schedules a second communication on the PSSCH, wherein the first communication and the second communication are scheduled according to a rule for overlapping or ordering communications on the PSSCH that are associated with one or more hybrid automatic repeat request (HARQ) identifiers (IDs); and transmitting the first communication and the second communication as scheduled.

\* \* \* \* \*